(12) United States Patent
Booth

(10) Patent No.: US 10,949,870 B2
(45) Date of Patent: Mar. 16, 2021

(54) TECHNIQUES FOR USER-CONTROLLED REAL-TIME DATA PROCESSING

(71) Applicant: Brian Booth, San Diego, CA (US)

(72) Inventor: Brian Booth, San Diego, CA (US)

(*) Notice: Subject to any disclaimer, the term of this patent is extended or adjusted under 35 U.S.C. 154(b) by 648 days.

(21) Appl. No.: 15/059,275

(22) Filed: Mar. 2, 2016

(65) Prior Publication Data

US 2016/0180368 A1     Jun. 23, 2016

Related U.S. Application Data

(63) Continuation-in-part of application No. 13/927,046, filed on Jun. 25, 2013, now abandoned.

(51) Int. Cl.
    *G06Q 30/02*     (2012.01)
    *G06Q 20/20*     (2012.01)
    (Continued)

(52) U.S. Cl.
CPC ....... *G06Q 30/0226* (2013.01); *G06Q 20/204* (2013.01); *G06Q 20/24* (2013.01); *G06Q 20/387* (2013.01); *G06Q 30/0238* (2013.01)

(58) Field of Classification Search
CPC combination set(s) only.
See application file for complete search history.

(56) References Cited

U.S. PATENT DOCUMENTS 7,620,567 B2    11/2009   George et al.
7,693,785 B1    4/2010   Drysdale
(Continued)

FOREIGN PATENT DOCUMENTS

JP     2000-353280 A    12/2000
JP     2005-326967 A    11/2005
(Continued)

OTHER PUBLICATIONS

Leenheer et al, Do loyalty programs really enhance behavioral loyalty? An empirical analysis accountin for self-selecting members, Intern Journal of Research in Marketing, 24, 2007, 31-47 (Year: 2007).*

(Continued)

*Primary Examiner* — Marie P Brady
(74) *Attorney, Agent, or Firm* — Perkins Coie LLP

(57) ABSTRACT

An automated method adapted to associate a consumer with a rewards program is described. The method includes: providing a bill to the consumer using a processing device; receiving payment information regarding the consumer; receiving biographical information regarding the consumer; and updating information regarding a user account associated with the rewards program. A software application adapted to process a payment and update rewards program information includes sets of instructions for: generating a bill for a set of goods or services provided to a consumer; receiving a method of payment from the consumer; determining an account associated with the method of payment; and updating the rewards program information associated with the account. An automated method of facilitating a redemption associated with a rewards program includes: receiving a bill associated with a consumer purchase; receiving payment information from the consumer; and applying at least a portion of a redemption balance to the bill.

14 Claims, 17 Drawing Sheets

(51) Int. Cl.
*G06Q 20/38* (2012.01)
*G06Q 20/24* (2012.01)

(56) References Cited

U.S. PATENT DOCUMENTS

| | | | |
|---|---|---|---|
| 7,769,630 B2* | 8/2010 | Postrel | G06Q 30/0227 705/14.28 |
| 7,774,231 B2 | 8/2010 | Pond et al. | |
| 7,831,246 B1 | 11/2010 | Smith et al. | |
| 8,121,946 B1 | 2/2012 | Arguello et al. | |
| 8,145,568 B2 | 3/2012 | Rackley, III et al. | |
| 8,195,500 B2 | 6/2012 | Tavares et al. | |
| 8,285,588 B2 | 10/2012 | Postrel | |
| 8,290,433 B2 | 10/2012 | Fisher et al. | |
| 8,369,828 B2 | 2/2013 | Hamzeh | |
| 8,374,916 B2 | 2/2013 | White | |
| 8,381,971 B2 | 2/2013 | Lambert et al. | |
| 8,386,309 B2 | 2/2013 | Thibedeau et al. | |
| 8,386,386 B1 | 2/2013 | Zhu | |
| 8,387,858 B2 | 3/2013 | Bohn et al. | |
| 8,396,797 B2 | 3/2013 | Wagner et al. | |
| 8,406,737 B2 | 3/2013 | Jung et al. | |
| 8,407,088 B2 | 3/2013 | Graves et al. | |
| 8,423,400 B2 | 4/2013 | Walker et al. | |
| 2001/0056405 A1 | 12/2001 | Muyres et al. | |
| 2002/0188509 A1* | 12/2002 | Ariff | B01J 23/6562 705/14.25 |
| 2005/0043992 A1* | 2/2005 | Cohagan | G06Q 30/0226 705/14.11 |
| 2006/0224449 A1* | 10/2006 | Byerley | G06Q 30/0226 705/14.27 |
| 2007/0022047 A1* | 1/2007 | Kingsborough | G06Q 20/102 705/39 |
| 2007/0083444 A1 | 4/2007 | Matthews | |
| 2007/0112632 A1 | 5/2007 | Voltmer et al. | |
| 2007/0214000 A1* | 9/2007 | Shahrabi | G06Q 30/0204 705/1.1 |
| 2007/0288311 A1 | 12/2007 | Underhill | |
| 2008/0011837 A1* | 1/2008 | Wesley | G06Q 20/327 235/383 |
| 2008/0015938 A1* | 1/2008 | Haddad | G06O 30/0268 705/14.38 |
| 2008/0097769 A1* | 4/2008 | Galvin | G06Q 30/02 705/346 |
| 2009/0182654 A1 | 7/2009 | Mullen et al. | |
| 2010/0094699 A1 | 4/2010 | Beal | |
| 2010/0280896 A1* | 11/2010 | Postrel | G06Q 30/0228 705/14.29 |
| 2011/0307318 A1 | 12/2011 | Laporte et al. | |
| 2012/0041808 A1 | 2/2012 | Hofer | |
| 2012/0101881 A1* | 4/2012 | Taylor | G06Q 30/02 705/14.13 |
| 2012/0240198 A1* | 9/2012 | Shannon | G06Q 20/108 726/4 |
| 2012/0271705 A1* | 10/2012 | Postrel | G06Q 20/201 705/14.33 |
| 2013/0041727 A1 | 2/2013 | Baker | |
| 2013/0046604 A1 | 2/2013 | Jones et al. | |
| 2013/0117126 A1* | 5/2013 | Coppinger | G06Q 30/0207 705/14.66 |
| 2013/0138497 A1* | 5/2013 | Yan | G06Q 20/32 705/14.31 |
| 2014/0156375 A1* | 6/2014 | Vaughan | G06Q 40/02 705/14.38 |
| 2014/0279112 A1* | 9/2014 | Ulrich | G06Q 20/322 705/21 |
| 2014/0379453 A1 | 12/2014 | Booth | |
| 2015/0019317 A1* | 1/2015 | Mitchell | G06Q 30/0226 705/14.27 |
| 2015/0186918 A1* | 7/2015 | Clarke | G06Q 20/405 705/14.23 |
| 2015/0310477 A1* | 10/2015 | Mankoff | G06Q 30/0226 705/14.27 |

FOREIGN PATENT DOCUMENTS

| | | |
|---|---|---|
| JP | 2015-185150 A | 10/2015 |
| JP | 2018-546592 A | 2/2016 |
| WO | 2005091843 | 10/2005 |
| WO | 2006086725 | 8/2006 |

OTHER PUBLICATIONS

International Search Report and Written Opinion for PCT Application No. PCT/US2017/020405, dated Jul. 27, 2017, 8 pages.
Extended European Search Report dated Jun. 4, 2019 in European Patent Application No. 17760795.9, 11 pages.
Final Office Action dated Mar. 23, 2015 in U.S. Appl. No. 13/927,046 for Booth et al., filed Jun. 25, 2013, 25 pages.
Non-Final Office Action dated Oct. 15, 2014 in U.S. Appl. No. 13/927,046 for Booth et al., filed Jun. 25, 2013, 17 pages.
Non-Final Office Action dated Sep. 3, 2015 in U.S. Appl. No. 13/927,046 for Booth et al., filed Jun. 25, 2013, 30 pages.
Examination Report dated Jun. 10, 2020 in European Patent Application No. 17760795.9, 12 pages.
Notice of Reasons for Rejection from Japanese Patent Application No. JP2018-546592 dated Oct. 2, 2020 (English Translation attached).

\* cited by examiner

TECHNIQUES FOR USER-CONTROLLED REAL-TIME DATA PROCESSING

PRIORITY CLAIM

The present document claims priority to and is a continuation-in-part of U.S. patent application Ser. No. 13/927,046, titled "Automated Payment, Reward Program Enrollment, and Redemption," filed on Jun. 25, 2013, the entirety of which is incorporated by reference herein.

TECHNICAL FIELD

The present document relates to real-time data processing, and more particularly, to a client-server technique for real-time data processing.

BACKGROUND

With recent advances in wireless communication and reduction in form factors of computing devices, it is becoming more and more common for users to be equipped with internet-connected devices at all places at all times. It is desirable to use the ubiquitous internet connectivity as a productivity tool and not simply for entertainment or social networking only.

For example, many establishments (e.g., retailers, restaurants, service providers such as automotive service establishments, online commerce sites (or "e-commerce" sites, mobile device commerce utilities (or "m-commerce" utilities), etc.) may offer various loyalty or reward programs (e.g., "registered card" technology) that may calculate reward measures (e.g., by tabulating "points" associated with amounts spent on various items and/or types of items) and allow consumers to apply the reward measures to purchases (e.g., using a "redemption balance" of points) or to receive a cash back reward. In many cases, a consumer may be asked to join such a program while making a payment to the establishment (e.g., while checking out of a store, when paying a restaurant tab, etc.). When joining, a user may typically be required to fill in a form, paper or online, answer a series of questions from an associate, and/or perform other tasks in order to provide registration information to the establishment.

After joining, a user may typically will have to provide a membership card (or a code associated with an account such as a phone number) in order to participate in the loyalty program. In addition, an existing user may be required to perform additional steps in order to redeem rewards (e.g., by reducing the bill by redeeming some reward balance using a registered card then paying the remaining portion of the bill by applying a separate payment using a credit card).

The internet connectivity of business, e.g., restaurants, grocery stores, etc. has gone beyond simply dialing up a bank server for credit card authorization, to having high bandwidth access to the internet, including various service providers' servers. Furthermore, many businesses have begun providing wireless internet access to their patrons, including wireless devices that make it convenient for patrons to pay bills, select and order menus and so on. Some inventors have begun recognizing usefulness of such advances in internet technologies.

U.S. Pat. No. 7,769,630 to Postrel ("Postrel") discloses a technique for issuing, aggregating and redeeming rewards based on merchant transactions. In Postrel, user cardholders make online purchases with credit cards that are pre-enrolled by the card issuer. The user registration is typically done prior and Postrel fails to provide technology for on-site card registration.

U. S. Patent Application 2012/0041808 to Hofer et al. ("Hofer") discloses a system that converts pre-existing, issuer funded, non-monetary rewards into a monetary currency to be spent at retail storefronts. Hofer, however, fails to provide techniques for real-time and automated program enrollment at a point-of-sale.

U. S. Patent Application 2007/0288311 to Underhill ("Underhill") discloses a method for flexible incentive programs in sales organizations. Underhill's technique is a business-to-business web based incentive program directed for use by suppliers trying to create loyalty with other businesses who buy the suppliers product. The enrollment technique uses an outbound email to existing customers who can enroll for the program. Underhill's system thus fails to provide technology for a point-of-sale, real-time decision making by a user.

U. S. Patent Application 2007/0083444 to Matthews et al. ("Matthews") discloses a technique for automatic reconciliation of transaction account spent in an online transaction. Matthews fails to provide technology to connect a physical storefront merchant to a backend transaction computer.

U.S. Patent Application 2012/0101881 by Taylor et al. ("Taylor") discloses methods for promoting loyalty by transforming consumer credentials and consumer opt-ins into a financial transaction and offer redemption outputs. A user of Taylor's system, however, is required to register a credit card before the use, i.e., not in real-time and apart from the point-of-sale.

U. S. Patent Application 2011/0307318 to LaPorte et al. ("LaPorte") discloses a mobile retail royalty network in which a code is generated from a transaction. A customer can scan/photograph the code and send it to a loyalty server outside of the point of sale. LaPorte thus requires a user to have a mobile device and be pre-enrolled in a loyalty program. Thus LaPorte's technology fails to provide a real-time, point-of-sale solution.

U. S. Patent Application 2007/0112632 by Voltmer et al. ("Voltmer") discloses a system for networked loyalty program. Voltmer discloses earning rewards benefits by a consumer on a network-wide level without the retailer's direct participation in the rewards feature. This is achieved by associating a consumer ID with a particular payment vehicle, such as a consumer's credit card, debit card account, and/or bank account. However, Voltmer fails to provide a real-time, point-of-sale solution.

Thus there exists a need for a solution that overcomes limitations of present day point-of-sale device technologies, including data processing terminals such as hand-held devices that allow credit card transactions (e.g., VeriFone devices).

BRIEF SUMMARY

Some embodiments provide a way to efficiently enroll new members (or update existing member information) in a rewards or loyalty program when a consumer is making a payment for goods and/or services. The rewards program may be associated with an establishment or set of establishments.

When the consumer initiates payment for goods or services (e.g., by swiping a credit card), some embodiments may automatically collect information regarding the consumer (e.g., by retrieving information from a swiped credit card) and pre-populate various fields of a digital enrollment form (e.g., name, credit card number, etc.).

Some embodiments may manually collect additional information (e.g., email address, phone number, user preferences, etc.). The collected information may be used to enroll the consumer in the rewards program and automatically associate the payment method used by the consumer with the rewards account. Subsequently, if the consumer uses the same payment method at an establishment associated with the rewards program, the user's reward information may be automatically updated and/or applied by some embodiments, as appropriate. Likewise, if the consumer uses the same payment method at a different establishment associated with a different rewards program (after having signed up with a first rewards program), any required enrollment information may be automatically retrieved from the existing account and applied to the new rewards account.

Some embodiments may collect and/or generate information regarding a "bill" (which may include information associated with a receipt, purchase order, invoice, online shopping cart or checkout information, and/or other appropriate sources of information related to a purchase). Such information may include a list of goods and/or services, charges associated with each list item, etc. In some embodiments, the information may be associated with various reward rules (e.g., categories of rewards, reward rates, etc.) and/or other information (e.g., payment method, establishment location, sku, or stock-keeping unit number, etc.).

Some embodiments may automatically redeem a rewards balance (or a portion thereof) to apply to a bill based on received payment information. Such a redemption of rewards may be based at least partly on various appropriate factors (e.g., accumulated points, amount of the bill, type(s) of purchase(s), user preference or selection, etc.).

The information associated with each bill, enrollment, redemption, and/or other operations associated with some embodiments may be collected and provided to various parties. Such information may be collected at various appropriate times in various appropriate ways (e.g., through a web-based dashboard, via one or more application programming interfaces (APIs), etc.).

One exemplary embodiment provides an automated method adapted to associate a consumer with a rewards program. The method includes: providing a bill to the consumer using a processing device; receiving payment information regarding the consumer; receiving biographical information regarding the consumer; and updating information regarding a user account associated with the rewards program.

A second exemplary embodiment provides a software application adapted to process a payment and update rewards program information. The application includes sets of instructions for: generating a bill for a set of goods or services provided to a consumer; receiving a method of payment from the consumer; determining a user account associated with the method of payment; and updating the rewards program information associated with the user account.

A third exemplary embodiment provides an automated method of facilitating a redemption associated with a rewards program. The method includes: receiving a bill associated with a consumer purchase at a payment processing device; receiving payment information from the consumer; retrieving user account information associated with the consumer, wherein the user account information comprises a redemption balance; automatically applying at least a portion of the redemption balance to the bill; and processing the received payment information to settle any remaining portion of the bill.

The preceding Summary is intended to serve as a brief introduction to some embodiments of the disclosed technology. It is not meant to be an introduction or overview of all inventive subject matter disclosed in this document. The Detailed Description that follows and the Drawings (or "Figures" or "FIGs.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms.

BRIEF DESCRIPTION OF THE DRAWINGS

The novel features of the disclosed technology are set forth in the appended claims. However, for purpose of explanation, several embodiments are set forth in the following drawings.

DETAILED DESCRIPTION

In the following detailed description, numerous details, examples, and embodiments are set forth and described. However, it will be clear and apparent to one skilled in the art that the embodiments are not limited to the embodiments set forth and that implementations may be practiced without some of the specific details and examples discussed.

Several more detailed embodiments are described in the sections below. Section I provides a conceptual description of a system architecture used by some embodiments. Section II then describes conceptual software architectures used by some embodiments. Next, Section III describes various methods of operation used by some embodiments. Section IV describes various example GUI elements provided by some embodiments. Lastly, Section V describes an example of a computer system which implements some of the embodiments.

I. System Architecture

Figure 1:
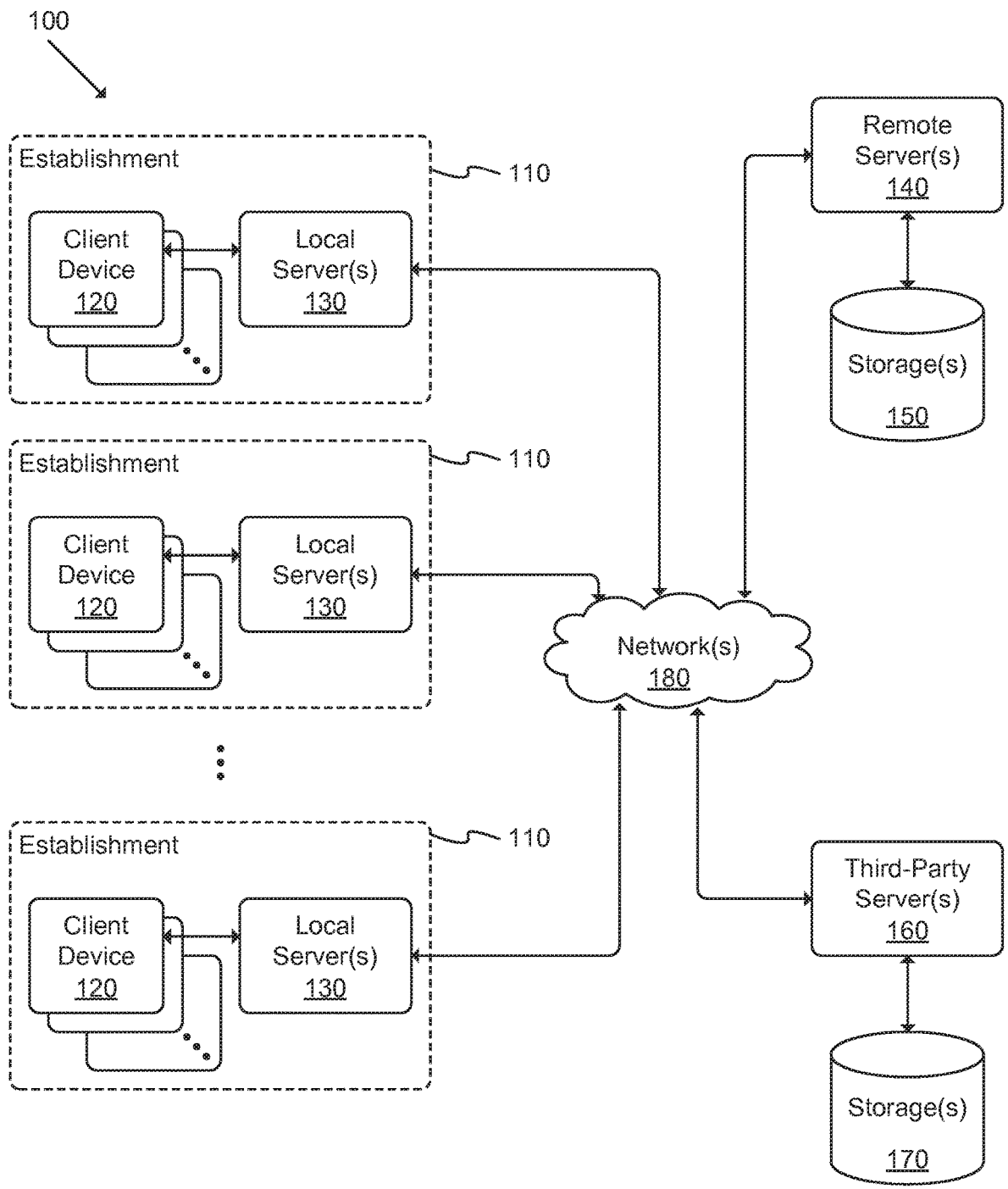
FIG. 1 illustrates a schematic block diagram of a conceptual system used by some embodiments.

FIG. 1 illustrates a schematic block diagram of a conceptual system 100 used by some embodiments. Specifically, this figure shows the various communication pathways among the system elements. As shown, the system may include one or more establishments 110, each establishment associated with one or more client devices 120 and local servers 130, at least one remote server 140 with an associated set of storages 150, a third party server 160 with an associated set of storages 170, and one or more networks 180.

Each establishment 110 may be a physical (and/or virtual) collection of devices that are associated with a single entity (e.g., a restaurant, a retail store location, an airplane, a train, etc.). Each client device 120 may be an electronic device capable of receiving and processing payment information (e.g., a mobile device such as a smartphone or tablet, a point-of-sale device such as a register or terminal, a dedicated credit card swipe device, etc.) and may be associated with a particular establishment 110. Each local server 130 may be an electronic device (e.g., a computer, a network interface, etc.) that is able to interact with the various client devices 120 associated with a particular establishment. In some embodiments, the local server 130 may provide the functionality of a client device 120 and may operate without any associated client devices. Each local server 130 may be able to access one or more networks. In some embodiments, a client device 120 may operate without a local server (e.g., the client device may be able to directly access one or more networks and/or perform other functions associated with the local server 130).

The remote server(s) 140 may include a set of devices (e.g., one or more computers) that is able to interact with each establishment 110. The remote servers 140 may be able to access a set of local storages 150, each storage able to store (and/or retrieve) data and/or instructions. The remote servers 140 and storages 150 may be associated with a first entity that is able to interact with the establishments 110 (e.g., through mutually-established protocols, using software provided by the first entity, etc.). Such a first entity may facilitate a payment and enrollment, redemption, and/or other appropriate process by interacting among the establishments 110 and/or appropriate third parties.

The third-party server(s) 160 may include a set of devices that are able to be accessed by the system 100. The third party severs 160 may be able to access a set of local storages 170, each storage able to store (and/or retrieve) data and/or instructions associated with a third-party system. The third-party servers 160 and/or storages 170 may be associated with various third-party entities (e.g., marketing systems, data mining systems, payment processing systems, etc.). Such so called third-party entities may also include entities associated with one or more establishments 110 (e.g., a regional restaurant chain with multiple franchisees, a retailer with multiple store locations, etc.).

The set of networks 180 may include various local and/or distributed networks (e.g., Ethernet, wireless local area or "Wi-Fi" networks, the Internet, cellular communication networks, etc.) that may be accessed by the various elements of the system 100. In some embodiments, the set of networks 180 may include various devices (not shown) and/or other sub-elements such as servers, storages, interfaces, etc. that may allow interaction among one or more networks, devices, etc.

The operation of system 100 will be described in more detail below in Section III.

One of ordinary skill in the art will recognize that the system 100 may be implemented in various different ways. For instance, different specific elements may be included or omitted. As another example, different communication pathways may be used. As still another example, various single elements may be divided into multiple elements and/or multiple elements may be combined into a single element.

In general, rewards programs are great, but difficult to enroll, use and redeem the reward. Loyalty programs are typically frequency, points, miles or cash back based. To manage the programs, providers either use closed loop loyalty cards, phone #, email, mobile phone application or registered credit card. In all cases, enrolling the customer initially is difficult. The customer usually needs to go through multiple steps to create an account, which is a deterrent. If the consumer ends up actually joining, then using the program has its own obstacles because a consumer needs to provide program credentials, which can be difficult to remember, as well as payment credentials. The customer's attitude toward the program drops off sharply once they make a purchase without successfully "earning" credit by either forgetting to provide the credential and/or the cashier not asking for the credential.

One would think that in today's world of technology, loyalty would be easier. This is why registered card loyalty programs are becoming popular. Customers simply pay with a registered credit card, and they get rewarded. Registered card programs are either card-centric or merchant centric. Card Centric approaches are credit card issuers and loyalty networks that make deals with the card issuers. Merchant centric programs are more organic in their attempt to convert customers in the store, with in store marketing and incentives, but it is difficult, especially without immediate gratification of an instant reward.

With card-centric programs, an issuer may have lots of card enrolled in a program, but very few of the enrolled cardholders are swiping their card at participating merchants largely because they don't know which merchants are participating. This leads to low customer performance at the merchant level in terms of spend per transaction and frequency of visits.

With the merchant centric approach, there may be fewer potential members, but since consumers convert at the store, they spend intentionally since they know they will be rewarded and thus their average spend per transaction is often 30% greater than a non-member's average spend per transaction.

The disclosed embodiments, among other aspect, provide for computer technologies that can be used to capture data from a secure memory location such as chip or magnetic strip located on a credit card, receive an email input, retrieve an opt-in command from a user and process computer transactions using the received information.

Therefore, the disclosed technologies, in one aspect, instead of merely facilitating communication, instead improve data entry aspects of a user device such as a point-of-sale device.

Some disclosed embodiments initiate computer processing after a card is swiped but before the credit card authorization takes place. Software code may be embedded in various ways within the existing code of a credit card transaction that interrupts or pauses the existing credit card authorization process, in order to qualify the customer, and then initiates completion of obtaining the authorization. At least one of the entities touching the transaction (e.g., the payment device, the issuer network, the gateway provider or the payment app itself) encrypts the card data and generates a unique ID. The party doing the encrypting is determined prior to installing the software based upon entity preference.

The unique id may range from store to store. For example, the same 16 digit card at store A will have assigned a unique ID which could be the same or different than a unique ID created by using the same 16 digit card at merchant B. The unique ID may only live within the context of a transaction and thus may have a limited lifetime of usefulness. The encryption may be a one-way encryption and cannot be reversed to obtain the actual digits of the card.

II. Example Software Architecture

Sub-section II.A describes a conceptual software system provided by some embodiments. Sub-section II.B then describes a client-side application provided by some embodiments. Next, sub-section II.0 describes a server-side application provided by some embodiments. Lastly, sub-section MD describes conceptual data structures used by some embodiments.

A. System-Level Examples

Figure 2:
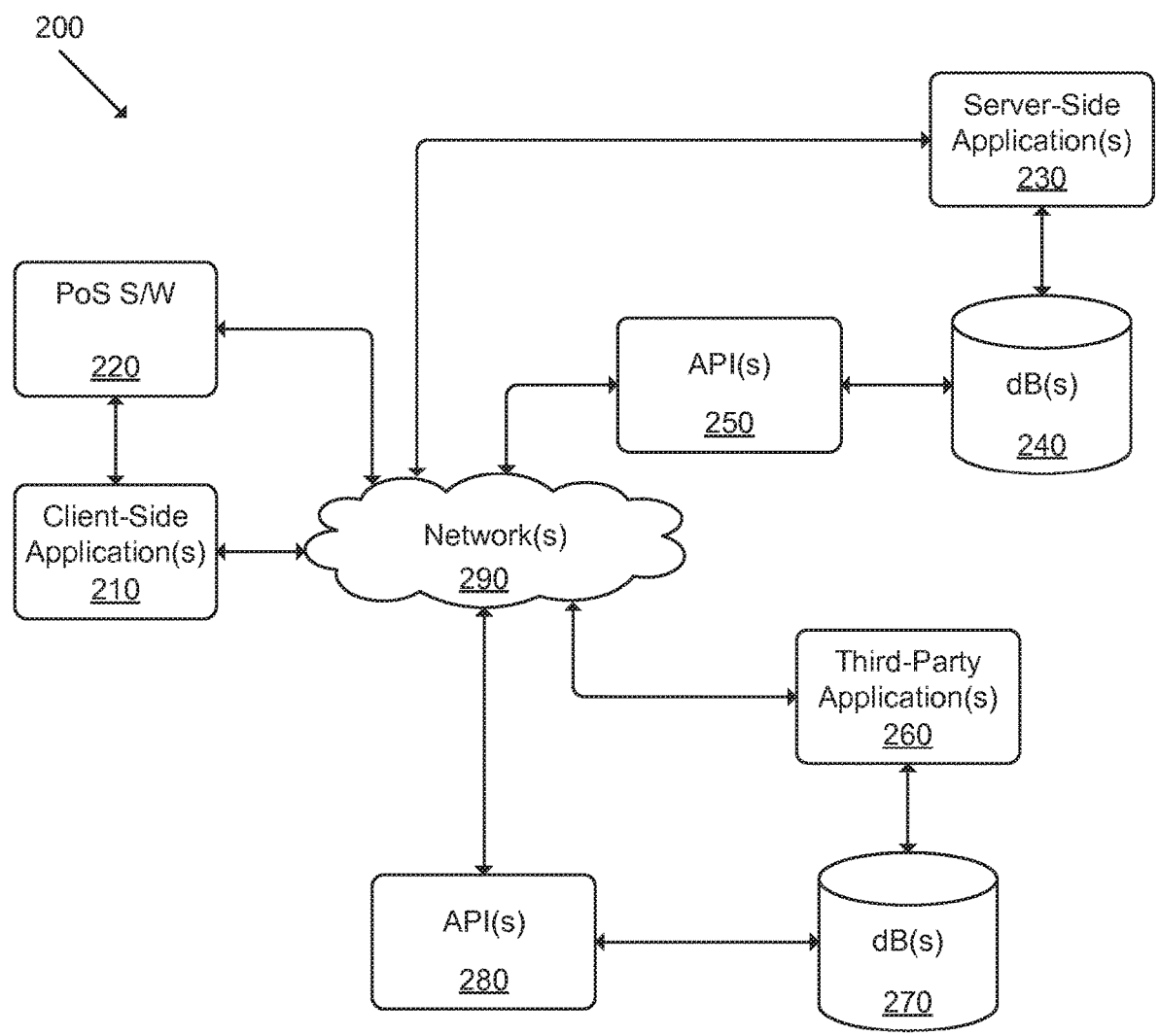
FIG. 2 illustrates a schematic block diagram of a conceptual software architecture used by some embodiments of the system of FIG. 1.

FIG. 2 illustrates a schematic block diagram of a conceptual software architecture 200 used by some embodiments of system 100 and/or other systems. Specifically, this figure shows various conceptual software elements that may allow the components of system 100 to interact. As shown, the software architecture 200 includes one or more client-side application 210, a set of point-of-sale software elements 220, one or more server-side applications 230, a set of server databases 240, one or more server APIs 250, a set of third-party applications 260, a set of third-party databases 270, one or more third-party APIs 280, and a set of network elements 290.

The client-side application 210 may be adapted to be executed by a client device (e.g., client device 120 described above) and may allow the client device to perform various system functions. The client-side application 210 may receive information from one or more users (e.g., a cashier, a server, a consumer, etc.), communicate with point-of-sale software running on a local server (e.g., local server 130 described above), provide information to one or more users and/or consumers (e.g., a receipt, form information, etc.), and/or perform other appropriate functions.

The point-of-sale software 220 may be adapted to be executed by a local server or other appropriate device (e.g., local server 130 described above) and may allow the local server to perform various system functions. The point-of-sale software 220 may receive information from one or more users (e.g., a cashier, a server, etc.) and/or a set of client-side applications, communicate across one or more network communication elements 290 joining one or more networks (e.g., networks 180 described above), provide information to one or more users and/or consumers (e.g., a receipt, form information, etc.), and/or perform other appropriate functions (e.g., receiving payment information, generating receipts, etc.).

The server-side application 230 may be adapted to be executed by a remote server or other appropriate device (e.g., remote server 140 described above) and may allow the remote server to perform various system functions. The server-side application 230 may be able to communicate among multiple sets of client-side applications (where each set may be associated with an establishment), communicate across one or more network communication elements 290 joining one or more networks (e.g., networks 180 described above), and/or perform other appropriate functions. In some embodiments, the server-side application 230 may be implemented as a plug-in that may be able to drive the operation of a client-side application and/or integrate with appropriate point of sale software.

The databases 240 may include data stored by some embodiments using an appropriate storage (e.g., storage 150 described above). Such data may include, for instance, data associated with one or more establishments or sets of establishments, data associated with various consumers (e.g., information regarding purchases made at participating establishments, loyalty account information, payment method information, etc.), and/or other appropriate data. The databases 240 may be accessed through the server-side application 230 or through one or more APIs 250, as appropriate. Such APIs may allow various external entities (e.g., third-party analysis firms, establishment-clients, etc.) to access data stored in the various databases 240.

The third-party application 260 may be adapted to be executed by a third-party server or other appropriate device (e.g., third-party server 160 described above) and may allow the third-party server to interact with the system of some embodiments. The third-party application 230 may be able to communicate among multiple sets of client-side applications (where each set may be associated with an establishment), communicate across one or more network communication elements 290 joining one or more networks (e.g., networks 180 described above), and/or perform other appropriate functions.

The databases 270 may include data stored by some embodiments using an appropriate storage (e.g., storage 170 described above). Such data may include, for instance, data associated with one or more third-parties (e.g., payment processing entities, research firms, etc.) and/or other types of data. The databases 270 may be accessed through the third-party application 260 or through one or more APIs 280, as appropriate. Such APIs may allow various external entities (e.g., the server-side application 230, client-side applications, point-of-sale software, etc.) to access data stored in the various databases 270.

The network communication elements 290 may include various interfaces, protocols, etc. that may allow the various software components (and/or the associated system elements) to communicate among each other.

Figure 15A:
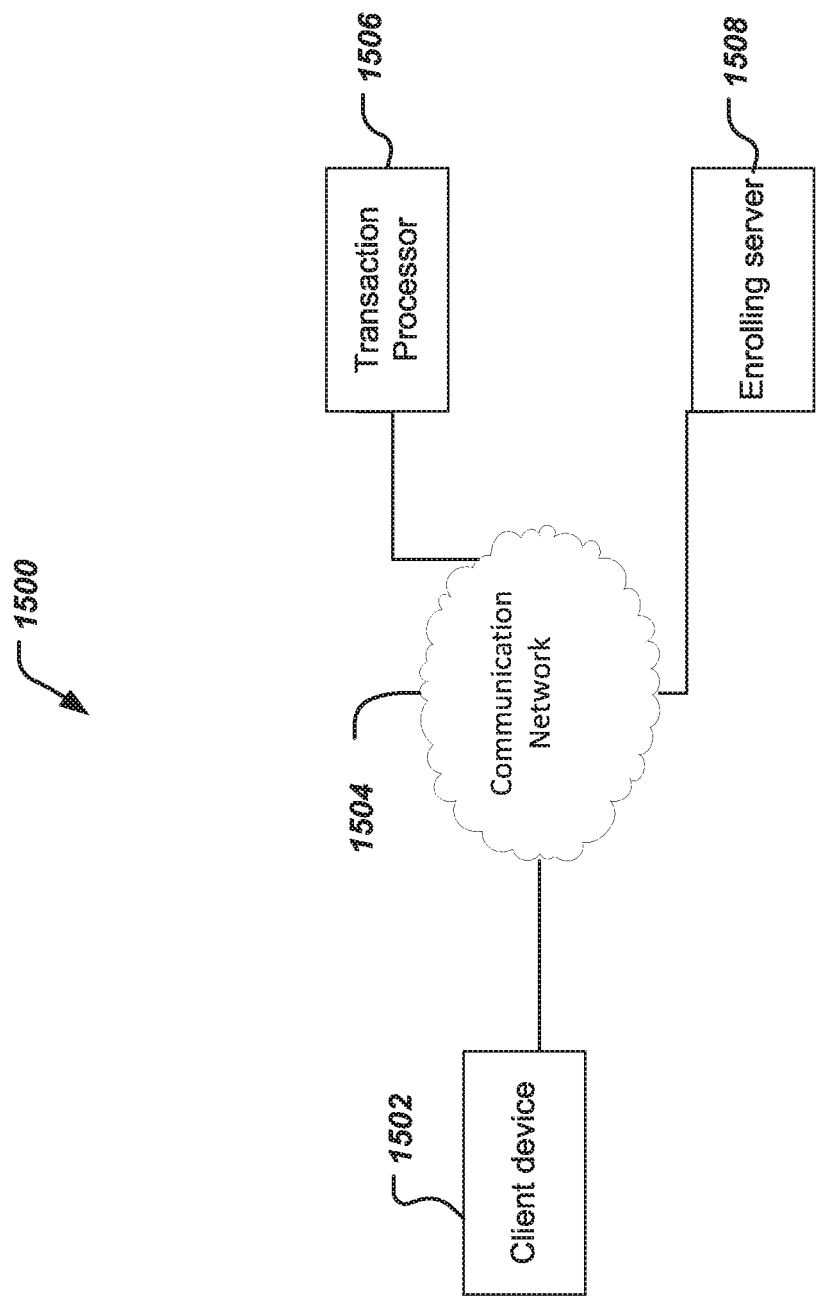
FIG. 15A shows a block diagram of an example computer network for data processing.

Another network configuration 1500 is depicted in FIG. 15A and shows a client device 1502, communicating via a communication network 1504 with a transaction processor 1506 and an enrolling server 1508. Some features of these devices are described in the present application.

One of ordinary skill in the art will recognize that the architecture 200 may be implemented in various different ways. For instance, different specific elements may be included or omitted. As another example, different communication pathways may be used. As still another example, various single elements may be divided into multiple elements and/or multiple elements may be combined into a single element.

B. Example Client-Side Embodiments

Figure 3:
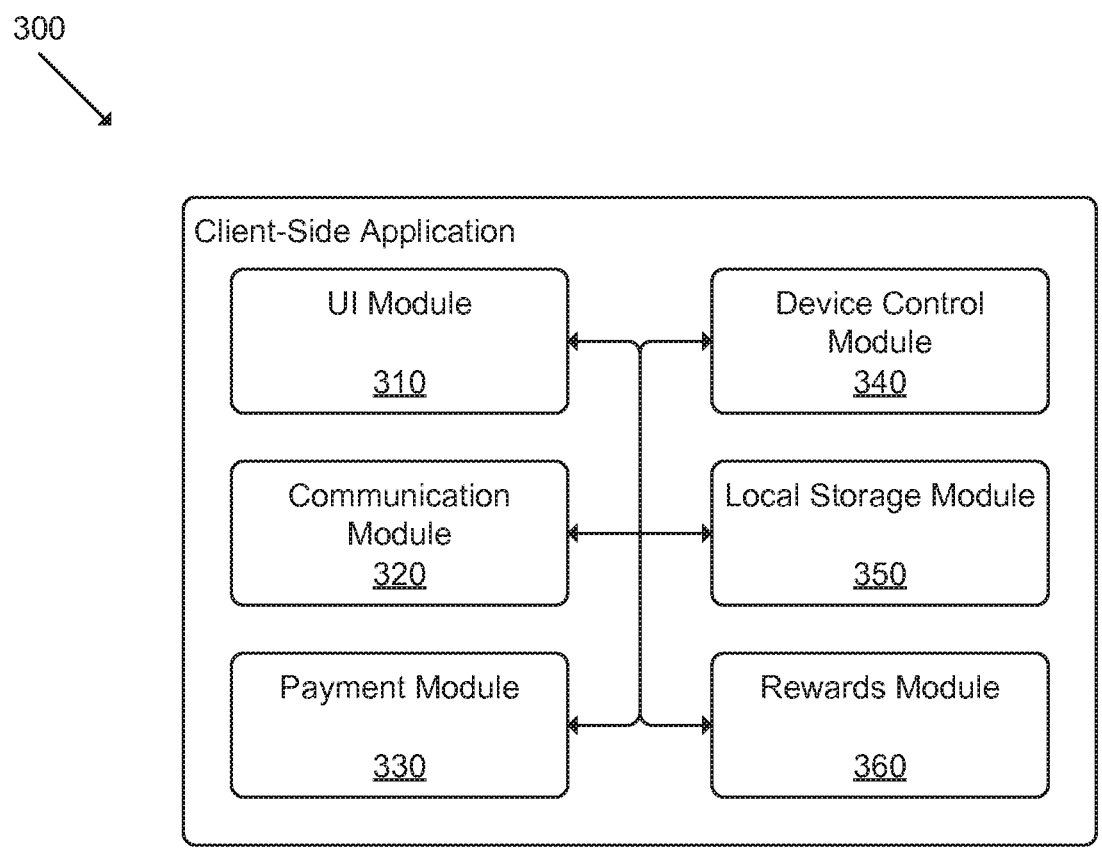
FIG. 3 illustrates a schematic block diagram of a conceptual client-side software application provided by some embodiments.

FIG. 3 illustrates a schematic block diagram of a conceptual client-side software application 300 provided by some embodiments (e.g., client-side application 210 described above). As shown, the application 300 may include a user interface (UI) module 310, a communications module 320, a payment module 330, a device control module 340, a local storage module 350, and a rewards module 360.

The UI module 310 may be adapted to generate various user interface elements and/or to process various user inputs. Such a UI module may allow, for example, a user to enter information onto a touch screen where the information is then collected by the client-side application.

The communication module 320 may allow the other elements of the client-side application 300 to interact with various external applications (e.g., a server-side application accessed through a set of network interfaces, a local server accessed across a local network, etc.).

The payment module 330 may be adapted to provide various functionality associated with payment processing such as collecting payment information (e.g., by receiving swiped credit card information, by receiving payment information entered by a consumer, etc.).

The device control module 340 may be adapted to allow the client-side application 300 to interact with various client device components, as appropriate. For instance, in some embodiments, the device control module 340 may allow the application 300 to control a touch screen element associated with the device. As another example, a point-of-sale terminal may be directed to display various instructions, forms, etc.

The local storage module 350 may be adapted to allow the client-side application 300 to access local storage associated with a client device.

The rewards module 360 may be adapted to interact with various remote servers, local servers, and/or third-party components to collect, analyze, and/or distribute rewards information. Such information may be associated with a loyalty or reward program which may be associated with one or more establishments.

One of ordinary skill in the art will recognize that the application 300 may be implemented in various different ways. For instance, different specific elements may be included or omitted. As another example, different communication pathways may be used. As still another example, various single elements may be divided into multiple elements and/or multiple elements may be combined into a single element.

C. Example Server-Side Embodiments

Figure 4:
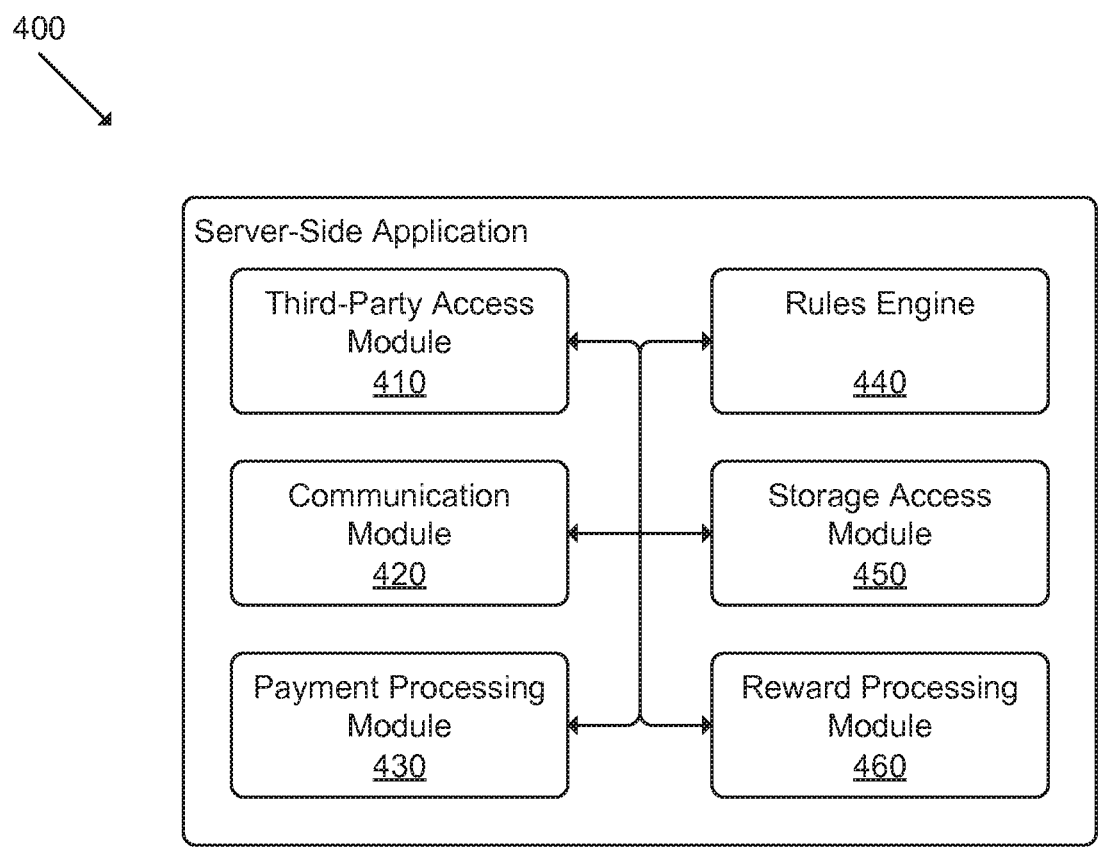
FIG. 4 illustrates a schematic block diagram of a conceptual server-side software application provided by some embodiments.

FIG. 4 illustrates a schematic block diagram of a conceptual server-side software application 400 provided by some embodiments (e.g., server-side application 230 described above). As shown, the application may include a third-party access module 410, a communication module 420, a payment processing module 430, a rules engine 440, a storage access module 450, and a reward processing module 460.

The third-party access module 410 may allow the system 400 to interact with various third-party applications. Such a module 410 may include one or more APIs.

The communication module 420 may allow the other elements of the server-side application 400 to interact with various external applications (e.g., a client-side application accessed through a set of network interfaces, a third-party application, etc.).

The payment processing module 430 may be adapted to provide various functionality associated with payment processing such as collecting payment information (e.g., by receiving information from a client-side application), formatting the information for submission to a third-party payment processor, and/or interpreting a set of responses received from a payment processor.

The rules engine 440 may be adapted to evaluate consumer information in relation to a set of program evaluation criteria to generate an appropriate set of actions based on a consumer (and/or third-party) interaction. For instance, some rewards programs may provide a bonus reward to a first time customer. As another example, some rewards programs may provide various promotional materials based on evaluations of consumer behavior.

The storage access module 450 may be adapted to allow the server-side application 400 to access local storage associated with the server (e.g., storages 150 described above).

The reward processing module 460 may be adapted to interact with various client devices, remote servers, and/or third-party components to collect, analyze, and/or distribute rewards information. Such information may be associated with a loyalty or reward program which may be associated with one or more establishments.

One of ordinary skill in the art will recognize that the application 400 may be implemented in various different ways. For instance, different specific elements may be included or omitted. As another example, different communication pathways may be used. As still another example, various single elements may be divided into multiple elements and/or multiple elements may be combined into a single element.

D. Example Data Structures

Figure 5:
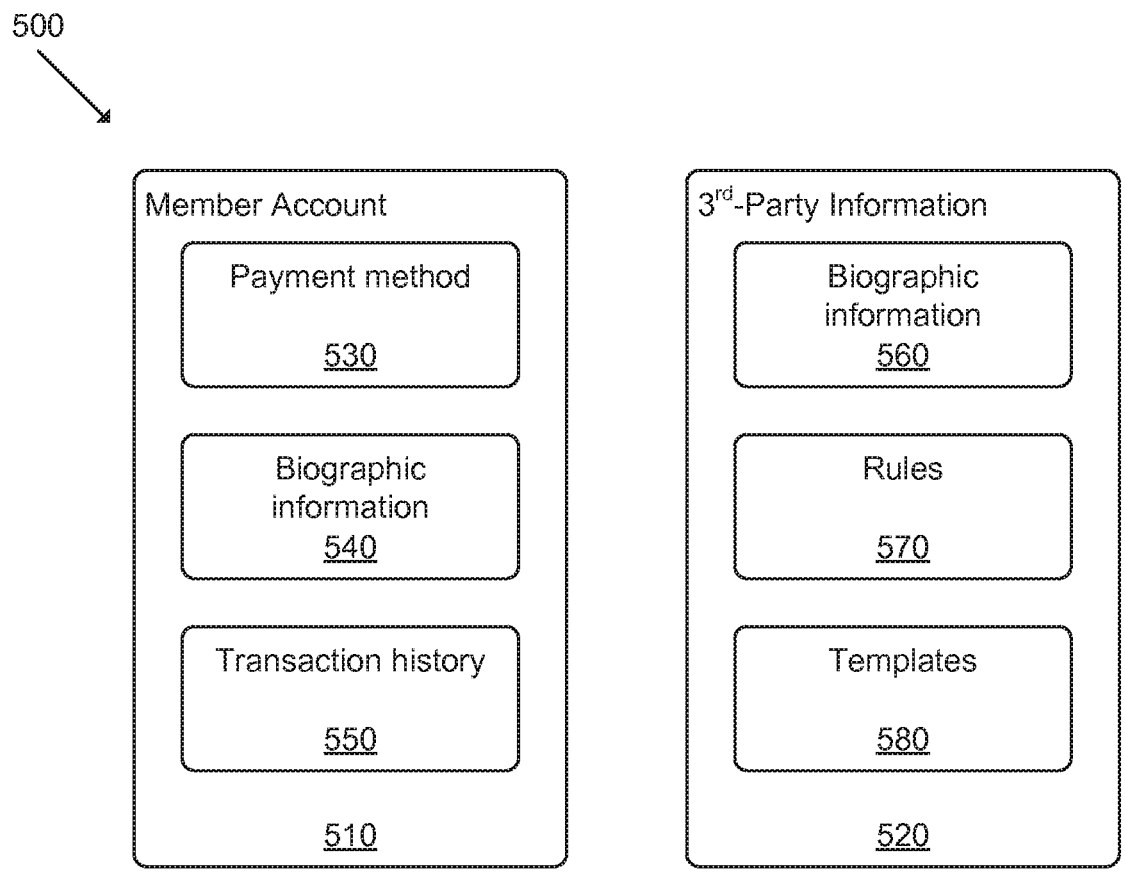
FIG. 5 illustrates a data structure diagram of conceptual data structures used by some embodiments.

FIG. 5 illustrates a data structure diagram of conceptual data structures 500 used by some embodiments. Such data structures may be used by the software applications described above in reference to FIGS. 2-4. As shown in FIG. 5, the data structures 500 may include a member account 510 and third-party information 520.

The member account element 510 may be associated with a particular user (or set of users such as a family, business, etc.) that has enrolled in a reward program. The member account may include a payment method 530 (e.g., credit card information, online payment account information, etc.), biographic information 540 regarding the user (e.g., name, email address, etc.). The transaction history 550 may include information related to previous interactions between the user and the establishment associated with the rewards program.

The third-party information 520 may be associated with a particular third party (e.g., an establishment or group of establishments, a payment processing service, etc.). The third-party information element may include biographic information 560 (e.g., the name of the establishment, the type of reward program, etc.), a set of rules 570 (e.g., criteria for sending offers to a consumer, criteria for generating a reward to a user, etc.), and a set of templates 580 (e.g., forms, promotion email templates, etc.). The third-party information 520 may be collected, updated, and/or otherwise maintained by the system of some embodiments (e.g., each set of rules may be associated with an establishment and maintained by the system).

One of ordinary skill in the art will recognize that the data structures 500 are conceptual in nature and different embodiments may implement the structures in various different ways. For instance, some embodiments may include additional specific elements and/or sub-elements and/or may omit specific elements and/or sub-elements. As another example, various sub-elements may be combined into a single element or a single element may be divided into multiple sub-elements.

III. Example Methods of Operation

Sub-section III.A provides a conceptual description of a payment process of some embodiments. Sub-section III.B then describes a conceptual enrollment process provided by some embodiments. Sub-section III.0 follows with a description of a conceptual redemption process provided by some embodiments. Next, sub-section III.D describes a conceptual process used by some embodiments to update existing account information. Sub-section III.E then provides a description of a conceptual process used by some embodiments to facilitate post-transaction marketing. Next, sub-section III.F describes a conceptual process used by some embodiments to collect and provide user data. Lastly, sub-section III.G describes a message flow used by some embodiments to implement various operations.

The various processes described below may be implemented using various combinations of the hardware elements described above in reference to FIG. 1, the software components described above in reference to FIGS. 2-4, the data structures described above in reference to FIG. 5 and/or other appropriate elements. In addition, the various processes described below (or portions thereof) may be implemented in various combinations as appropriate to provide various combinations of features (e.g., payment and enrollment, payment and reward redemption, etc.).

A. Example Embodiments of Payment Processing

Figure 6:
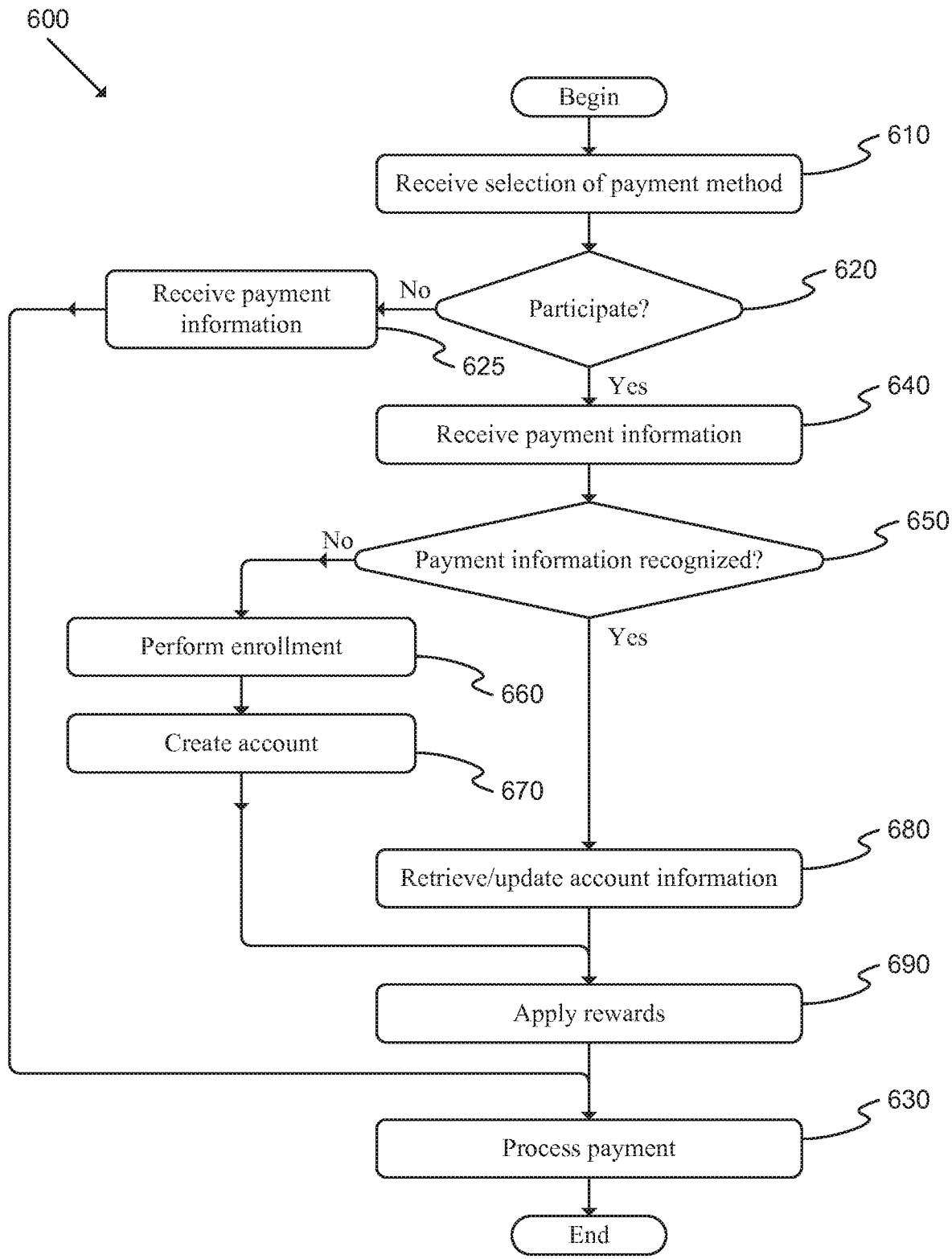
FIG. 6 illustrates a flow chart of a conceptual process used by some embodiments to facilitate payment and/or enrollment.

FIG. 6 illustrates a flow chart of a conceptual process 600 used by some embodiments to facilitate payment and/or enrollment. Such a process may begin, for instance, when a consumer is provided payment options using a tableside tablet device, when a server or cashier initiates a payment operation, etc. Next, the process may receive (at 610) selection of a payment option. Available options (e.g., pay with cash, pay with credit card, pay with online account, etc.) may be displayed in various appropriate ways (e.g., as a list, as a set of selectable buttons, etc.) and a selection from among the options may be received in various appropriate ways (e.g., using a touchscreen, using a display screen and keypad, etc.).

In some embodiments, the process may perform different sets of operations depending at least partly on the selected payment option (for instance, if "cash" is selected as the payment option, the process may simply display or print a bill and end).

Next, the process may offer (not shown) one or more incentives to enroll to a reward program and/or otherwise encourage users to participate. Such an offer may include, for instance, marketing materials, a one-time discount, etc. The process may then determine (at 620) whether the recipient of the offer wishes to participate in the reward program. Such a determination may be made based on input received from the recipient, entered by a server or other associate, and/or other appropriate ways. If the process determines that the recipient does not wish to participate, the process may receive (at 625) payment information and then process (at 630) the payment. Such payment information may be received in various appropriate ways (e.g., swiping a credit card, entering credit card or banking information, providing account information for a web-based payment method, etc.) and processed as appropriate.

Alternatively, if the process determines that the recipient does want to participate, the process may then receive (at 640) payment information. Such payment information may be received in various appropriate ways (e.g., swiping a credit card, entering credit card or banking information, providing account information for a web-based payment method, etc.).

Process 600 may then determine (at 650) whether the payment information is recognized (and/or whether the user is an existing user). Such a determination may be made in various appropriate ways (e.g., by comparing the payment information to a database of accounts, by prompting the user to indicate whether the user is a new or existing member, etc.).

In some embodiments, after a consumer has enrolled in the rewards program using a particular payment method, the user will automatically be recognized as an existing member when the same payment method is used, without requiring any additional action by the user. For example, when a user swipes a credit card as payment (e.g., using a fixed terminal, using a mobile device such as a tablet, etc.) and the credit card is determined to be associated with an existing account, the reward information may be updated and/or applied to the bill without requiring the user to make any additional selections or take any actions other than those necessary to process the payment as if the user was not enrolled.

If the process determines (at 650) that payment information is not recognized, the process may perform (at 660) enrollment and create (at 670) an account. Alternatively, if the process determines (at 650) that payment information is not recognized and the process also determines (not shown) that the user has already enrolled (e.g., by receiving an indication from the user, by determining that an email is already associated with an account, etc.), the process may determine whether to update the account information associated with the user (e.g., by adding another payment method to the account). Such a determination may be made based on various appropriate factors (e.g., user selection, default setting, etc.).

Enrollment may include the user being asked to provide an email address and/or other information. In some embodiments, the payment method and information associated with the method (e.g., the name, address, etc. of the recipient) may be automatically retrieved from the payment information received at 640 (e.g., a consumer's name may be encoded, along with an account number and/or other information on the magnetic strip on the back of a credit or bank card, a consumer's name may be known to a web-based payment service, etc.). Enrollment will be described in more detail in reference to process 700 below.

If process 600 determines (at 650) that the payment information is recognized, the process may retrieve and/or update (at 680) account information associated with the user. Such retrieval and/or update may include communicating with a remote server or other element to determine a status of the user (e.g., number of points accumulated, purchase history, etc.) and/or sending information to the server regarding the current interaction (e.g., amount paid, participation election, etc.). Updating of account information will be described in more detail in reference to process 900 below.

After retrieving and/or updating (at 680) the account information or after performing (at 660) enrollment and creating (at 670) an account, process 600 may apply (at 690) rewards to the account. Such rewards may be provided instantly in some embodiments (e.g., by automatically reducing the amount due from the consumer). Alternatively, the user's account may be updated to reflect additional rewards that have not been redeemed. In some embodiments, a user may be able to select (not shown) from among a set of available rewards to apply. For instance, a list of options may be presented (e.g., apply points to balance, redeem points for additional merchandise, etc.) and a selection received from among the listed options.

After applying (at 690) the rewards or after receiving (at 625) the payment information, the process may process (at 630) payment for the transaction (e.g., by interacting with a third-party application and/or server to perform a credit card transaction, by interacting with a web-based service, etc.) and then may end.

Process 600 may be performed in various different ways. For instance, different embodiments may include different operations, omit various operations, and/or perform the operations in a different order than shown. Some embodiments may divide the process into a set of sub-processes or perform the process as a sub-process of a larger macro process.

B. Example Embodiments of Enrollment

Figure 7:
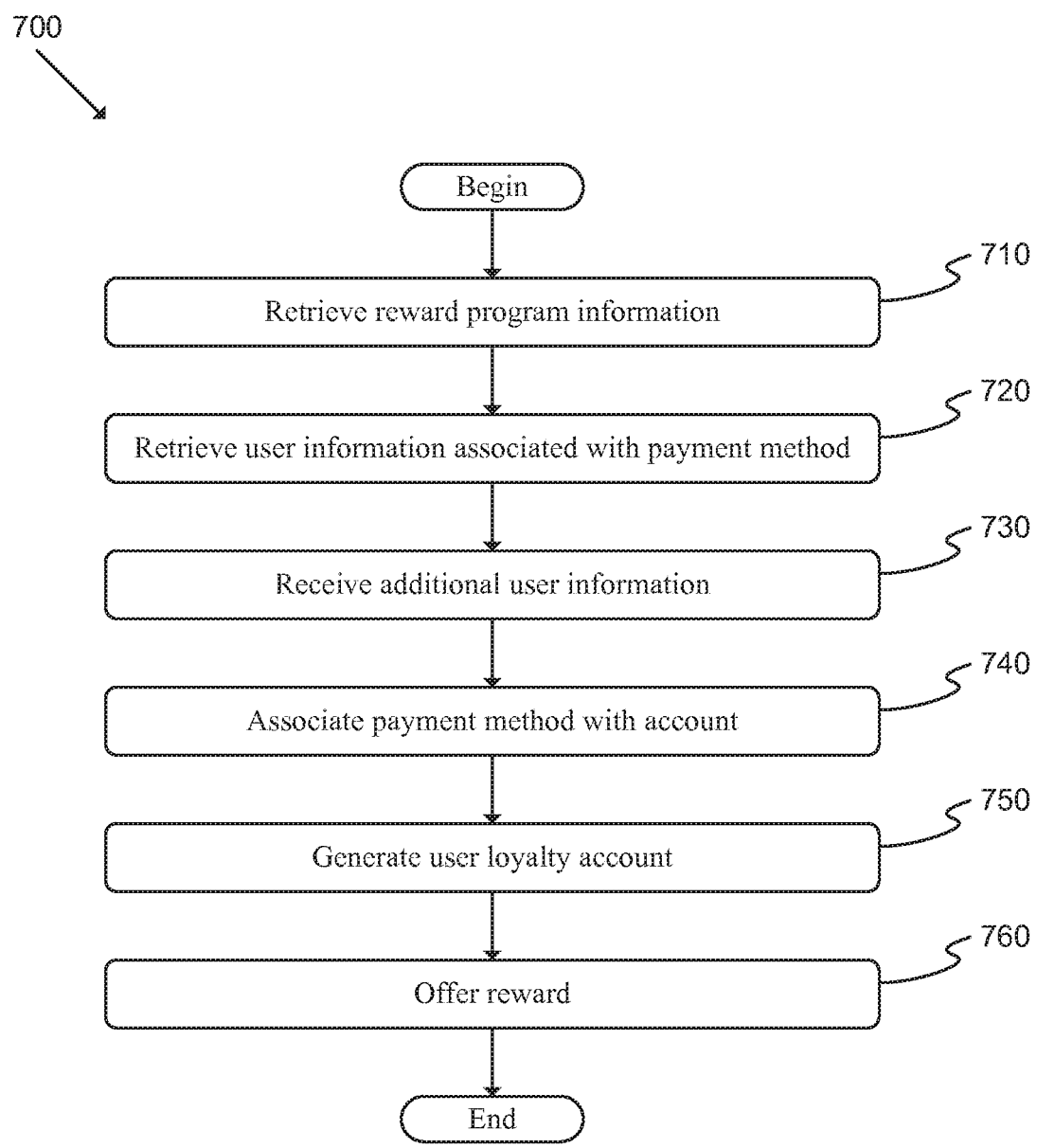
FIG. 7 illustrates a flow chart of a conceptual process used by some embodiments to perform enrollment of a new member.

FIG. 7 illustrates a flow chart of a conceptual process 700 used by some embodiments to perform enrollment of a new member. Such a process may be performed, for example, when a user elects to participate in a rewards program and is identified as a new member.

As shown, the process may retrieve (at 710) reward program information. Such information may include biographic information regarding an establishment or chain, rules, etc. Next, the process may retrieve (at 720) user information associated with a payment method (e.g., name and credit card number, username, etc.). Such information may be retrieved in various appropriate ways depending on the payment method (e.g., payment information and biographic information may be retrieved from data stored in a magnetic strip on a bank card when the card is swiped, the information may be received from a third-party, etc.).

The process may then receive (at 730) additional user information. Such information may be received in various appropriate ways (e.g., by providing a user interface with various form elements such as text fields, check boxes, selection lists, etc. that allow a user to enter the information). The additional information may include contact and/or biographic information (e.g., email address, social networking page, birthday, mobile phone number, ZIP code, etc.), user preferences (e.g., prefer weekly emails, daily emails, etc.), and/or other appropriate information (e.g., number of times eating out per month, annual income, etc.). In some embodiments, various rewards, marketing materials, etc. may be based at least partly on the contact and/or biographic information.

Next, the process may associate (at 740) the payment method with the user's account information and generate (at 750) a user loyalty account. The user loyalty account and associated payment method may be stored using a remote server and storage.

The process may then offer (at 760) a reward (e.g., bonus reward, instant reward, etc.) and then may end. Such rewards may be based on various appropriate criteria (e.g., money spent, number of visits, status of the user (e.g., new member, repeat customer, etc.), etc.). Such rewards may be at least partly based on a set of rules associated with the reward program.

Process 700 may be performed in various different ways. For instance, different embodiments may include different operations, omit various operations, and/or perform the operations in a different order than shown. Some embodiments may divide the process into a set of sub-processes or perform the process as a sub-process of a larger macro process.

C. Example Embodiments of Redemption

Figure 8:
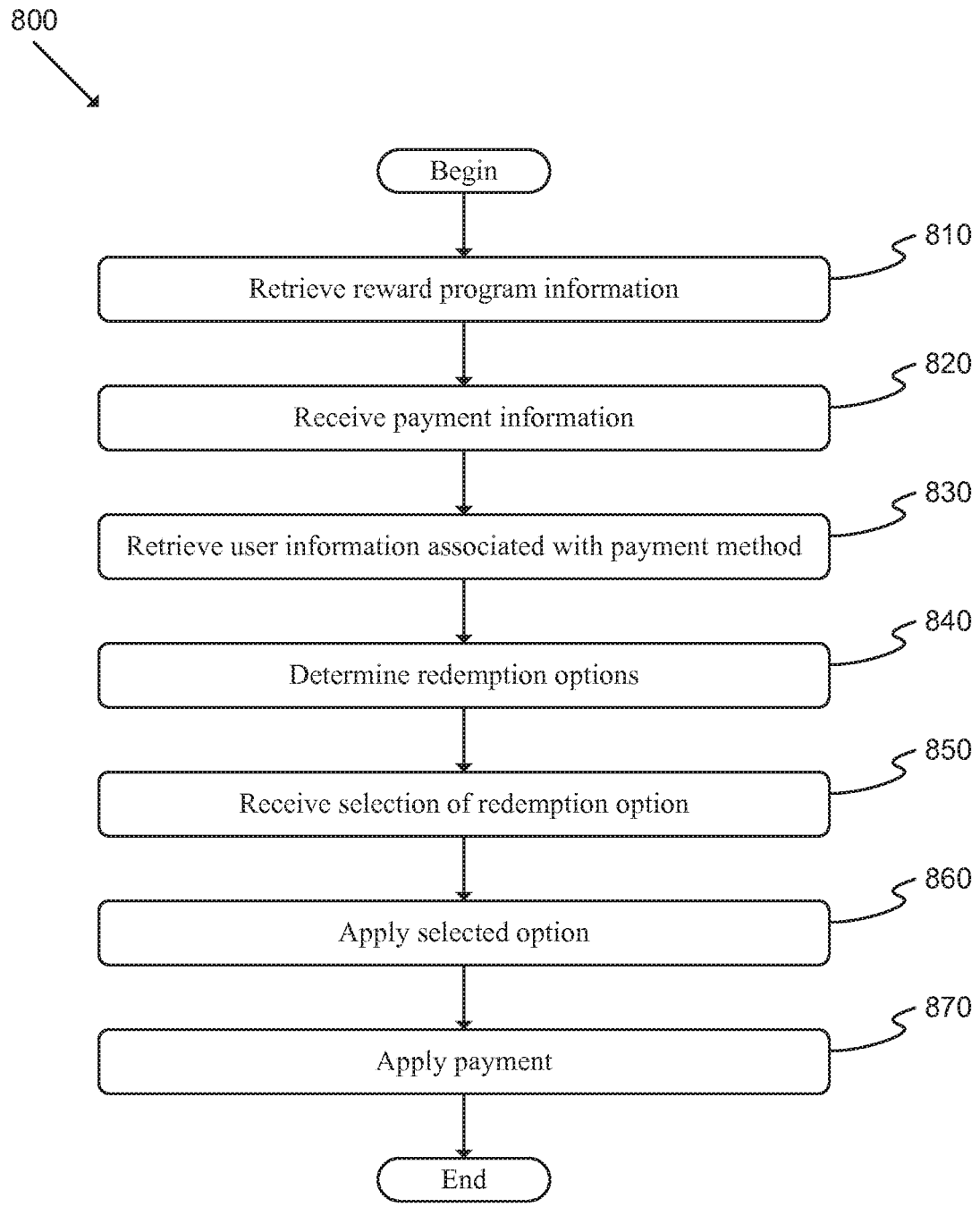
FIG. 8 illustrates a flow chart of a conceptual process used by some embodiments to apply a redemption.

FIG. 8 illustrates a flow chart of a conceptual process 800 used by some embodiments to apply a redemption. Such a process may be performed, for example, when an existing user makes a purchase using a registered payment method at an establishment associated with a rewards program.

As shown, process 800 may retrieve (at 810) reward program information (e.g., categories, thresholds, etc.) and then receive (at 820) payment information (e.g., by receiving a swiped credit card) and then retrieving (at 830) user information associated with the payment method. Such information may be retrieved using an appropriate system and software of some embodiments. Alternative, new user information may be collected, if appropriate.

Next, the process may determine (at 840) the redemption options (e.g., apply points to a purchase, receive a gift or promotional item, etc.). Such redemption options may be included with the retrieved reward program information. The process may then receive (at 850) a selection of a redemption option (e.g., by receiving a user input, performing a default selection, etc.) and apply (at 860) the selected option (e.g., by reducing the bill by an amount associated with a number of reward points, by applying a promotional reward such as a free dessert, etc.). Finally, the process may apply (at 870) the payment (e.g., by sending credit card information to a third-party processor) and then may end.

Process 800 may be performed in various different ways without departing from the spirit of the invention. For instance, different embodiments may include different operations, omit various operations, and/or perform the operations in a different order than shown. Some embodiments may divide the process into a set of sub-processes or perform the process as a sub-process of a larger macro process.

D. Example Embodiments of Account Update

Figure 9:
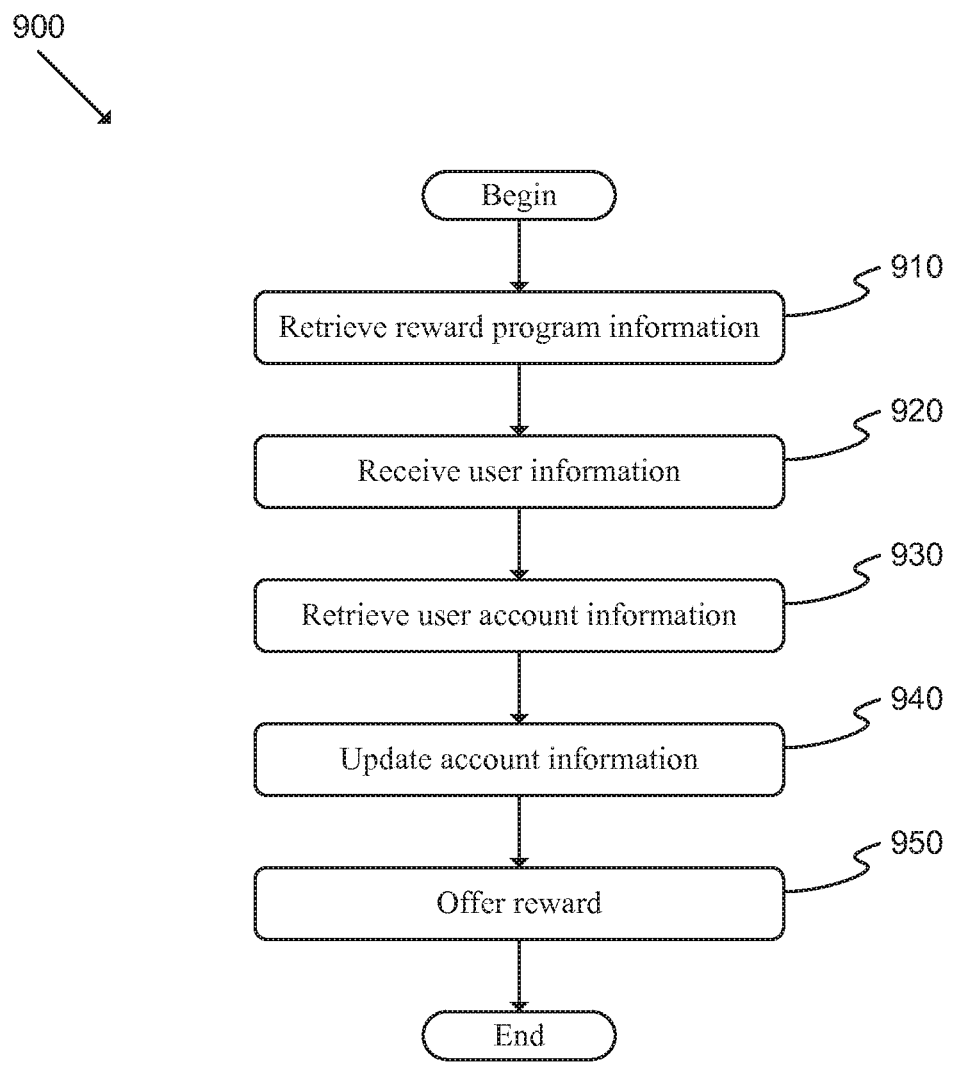
FIG. 9 illustrates a flow chart of a conceptual process used by some embodiments to update information associated with an existing member.

FIG. 9 illustrates a flow chart of a conceptual process 900 used by some embodiments to update information associated with an existing member. Such a process may be performed, for example, when a user elects to participate in a rewards program and is identified as an existing member. Alternatively, an existing member may make a selection indicating that the user's information has changed (e.g., payment method, address, preferences, etc.). As another example, an existing user may pay with a payment method that has not been previously associated with the rewards account (e.g., a new credit card may be used and the user also indicates that the user has previously enrolled). In some embodiments, the process may automatically be performed when a new credit card (or other payment method) is not recognized.

As shown, the process may retrieve (at 910) reward program information and receive (at 920) user information. Such reward program information may include biographic information regarding an establishment or chain, rules, etc. Such user information may include user account information (e.g., username and password, email address, etc.) and/or updates to the user information (e.g., a new payment method, an additional or updated phone number, an updated email address, etc.). For example, if a user swipes an unrecognized credit card and also indicates that the user is an existing user, the user may be asked to provide an email address associated with the rewards account (or a username and password, and/or other appropriate identifying information).

Next, the process may retrieve (at 930) user account information. The user account information may include biographic information, payment method information, information related to interaction history, and/or other appropriate data. Such account information may be retrieved based at least partly on the user information received at 920 (e.g., a username or email supplied by the user may be used to identify an account associated with the user such that the account information may be retrieved).

The process may then update (at 940) the user account information, if appropriate. For instance, if a credit card is used for payment and is not associated with any user account, but the user makes a selection indicating that the user has an existing account, the new payment method may be associated with the existing account (and thus automatically be recognized in the future, along with any other active payment methods).

Process 900 may then offer (at 950) a reward and then may end. Such rewards may be based on various appropriate criteria (e.g., money spent, number of visits, status of the user (e.g., new member, repeat customer, etc.), etc.). Such rewards may be at least partly based on a set of rules associated with the reward program.

Although process 900 has been described by reference to an example where a user adds a new payment method to an existing rewards account, a similar process may be used to add an existing payment method to a new rewards account. For instance, if a user has an existing rewards account with a first merchant associated with a payment method, and the user applies that payment method at a second merchant, some embodiments may automatically recognize the existence of an account with the first merchant and apply the user information (e.g., name, email, address, ZIP code, social media information, etc.) to creation of an account with the second merchant.

Process 900 may be performed in various different ways. For instance, different embodiments may include different operations, omit various operations, and/or perform the operations in a different order than shown. Some embodiments may divide the process into a set of sub-processes or perform the process as a sub-process of a larger macro process.

E. Post-Transaction Marketing

Figure 10:
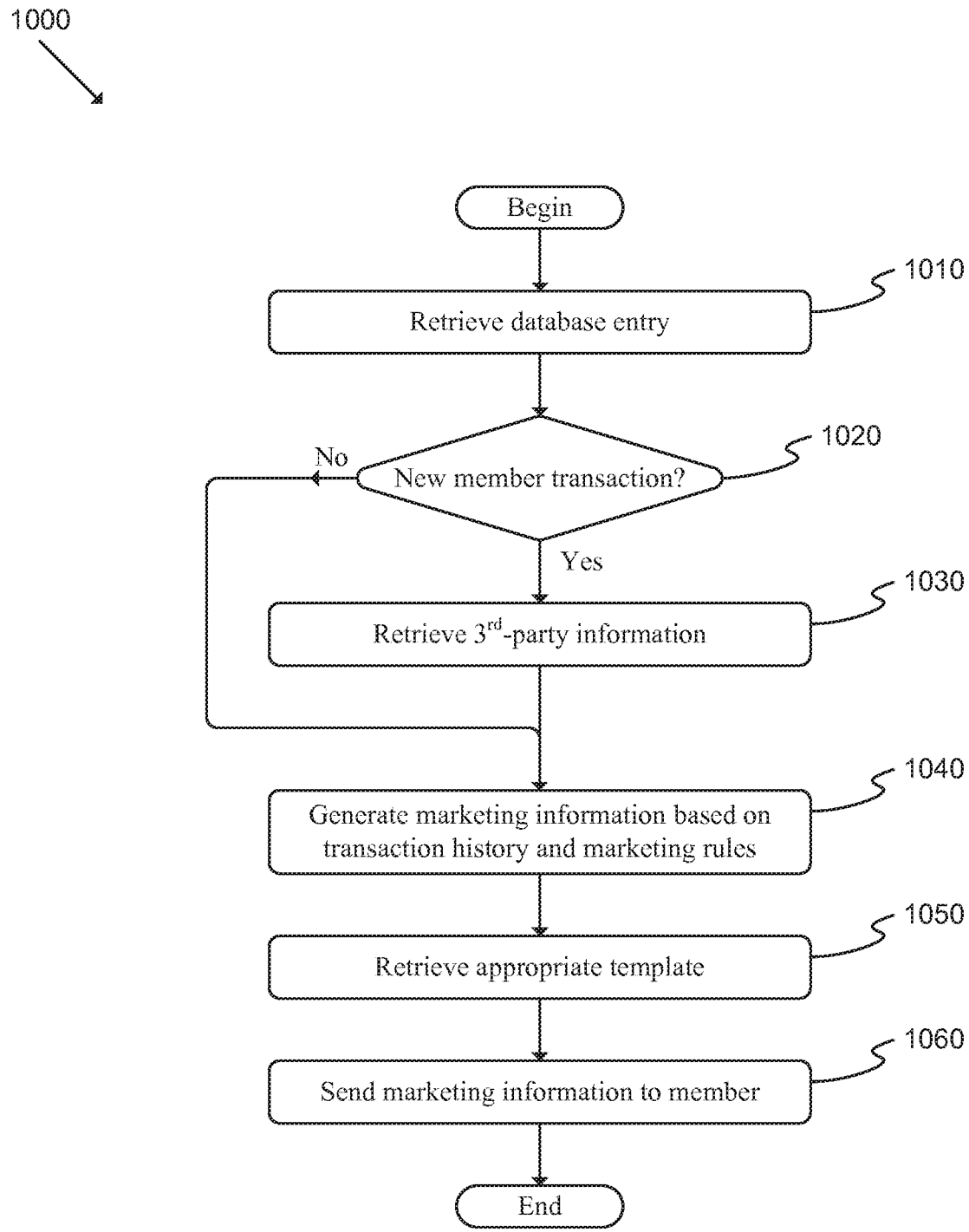
FIG. 10 illustrates a flow chart of a conceptual process used by some embodiments to optimize post-transaction marketing.

FIG. 10 illustrates a flow chart of a conceptual process 1000 used by some embodiments to optimize post-transaction marketing. Such a process may be executed at regular intervals (e.g., hourly, daily, weekly, etc.), may be executed based on various criteria (e.g., new user signup, update to existing account, during a holiday, at a specific time of day, etc.), and/or at other appropriate times (e.g., when a retailer initiates a promotional offer, when a threshold such as a spending threshold is reached, based on transaction history, based on customer spending behavior, etc.).

Such a process may trigger various appropriate actions such as receipt delivery (e.g., emailing a receipt with an included marketing offer, sending a marketing email with a coupon, etc.). In some embodiments, a receipt may include a selectable element (e.g., a URL) that may allow a user to provide information regarding the expense (e.g., names of people met, items discussed, etc.) that may then be compiled for the user to utilize (e.g., when the user prepares tax information).

As shown, the process may retrieve (at 1010) a database entry. Such a database entry may be associated with a reward program transaction performed using some embodiments. Next, the process may determine (at 1020) whether the transaction involves a new member. If the process determines that the transaction does involve a new member, the process may then retrieve (at 1030) third-party information. Such third-party information may include marketing information (e.g., email templates, promotional content, etc.) that may be retrieved from an establishment, chain, marketing firm, and/or other appropriate third party.

After retrieving (at 1030) the third-party information, or after determining (at 1020) that transaction does not involve a new member, the process may generate (at 1040) marketing information based at least partly on the user's transaction history and a set of marketing rules. Next, the process may retrieve (at 1050) an appropriate marketing template (e.g., an email template) and send (at 1060) the marketing information to the member.

Process 1000 may be performed in various different ways. For instance, different embodiments may include different operations, omit various operations, and/or perform the operations in a different order than shown. Some embodiments may divide the process into a set of sub-processes or perform the process as a sub-process of a larger macro process.

F. Merchant Dashboard

Some embodiments may allow various merchants (or "users") such as establishments, groups of establishments, marketing organizations, etc. to access user (i.e., consumer) data. Such data may include any information related to user purchases made using the systems of some embodiments. The information may include user status information (e.g., new enrollment, existing member, purchase history, ZIP code, social media account information, etc.), payment information such as payment method, purchase information (e.g., a bill, a list of items, a total amount, timestamp, purchase location, etc.), establishment information (e.g., type, location, size, promotions, etc.), rewards information (e.g., rewards points accrued, rewards points redeemed, etc.), and/or other information that may be compiled by the system of some embodiments.

User data may be collected and/or compiled in various appropriate ways. For instance, some embodiments may continuously collect user data as the user data is received (e.g., when a user enrolls, when a user makes a payment with a registered merchant, etc.). As another example, user data may be collected from various establishments at various appropriate times and/or in various appropriate ways (e.g., a store may provide information at regular intervals, a regional chain may provide information formatted in a particular way, etc.). Such user data may include spending behavior, redemption behavior, demographic information, social media behavior (e.g., a tally of "likes" by enrolled users, sharing links with "friends", forwarding messages or links, etc.), etc. The data may be collected and/or made available in real time (i.e., as the data is provided to the system of some embodiments, the data may immediately be made available to various users). In addition, in some embodiments such collected data may be used to provide rewards to enrolled users (e.g., by a providing a reward for "liking" a product or service, by awarding additional points when a user shares a link, etc.).

Figure 11:
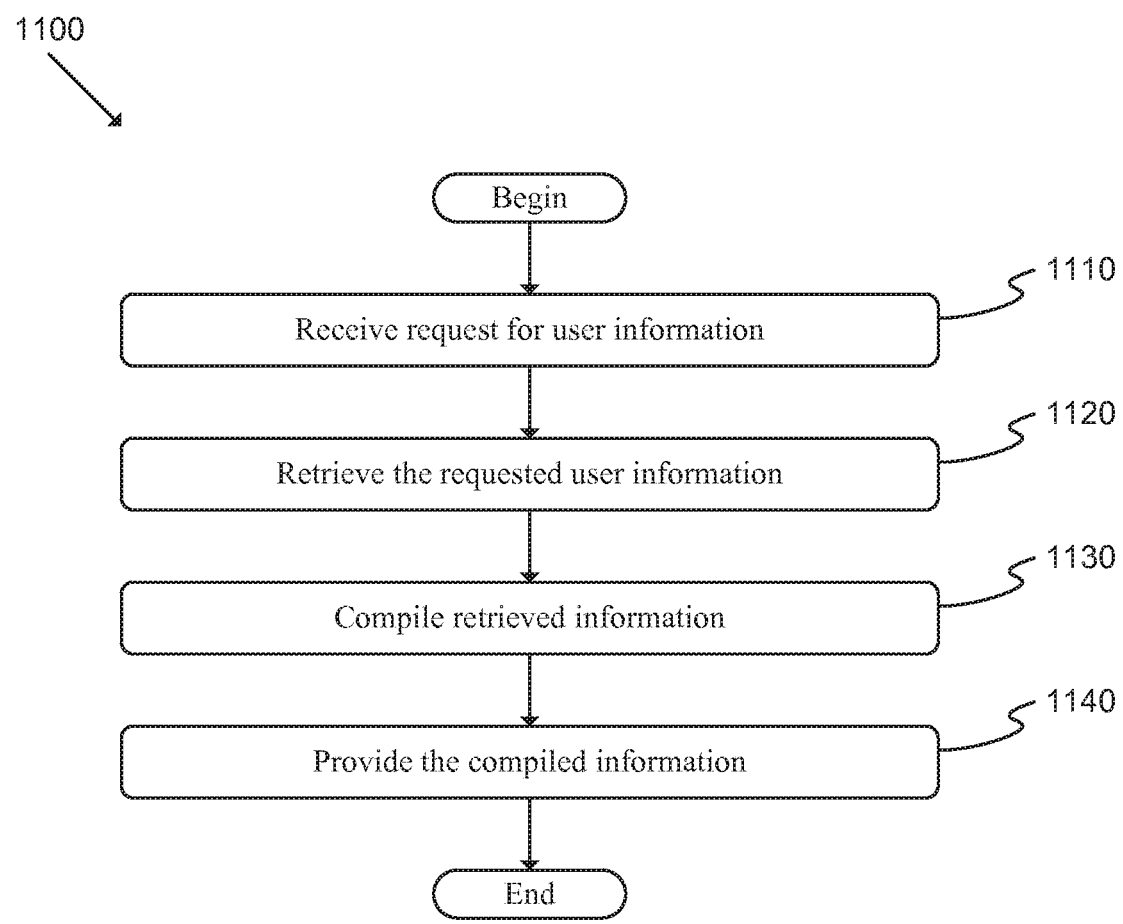
FIG. 11 illustrates a flow chart of a conceptual process used by some embodiments to provide analytic data to third parties.

FIG. 11 illustrates a flow chart of a conceptual process 1100 used by some embodiments to provide analytic data to third parties. In some embodiments, such a process may be executed continuously as user information is received.

The process may receive (at 1110) a request (or "query") for user information. Such user information may be aggregated in various appropriate ways, as desired by a merchant requesting the information (e.g., all users who have purchased more than a threshold amount over a recent time period, all users who enrolled within a specific time frame, etc.). Such a request may be received in various appropriate ways (e.g., through an API, via a web site or other such portal, through an application of some embodiments, as a formatted message, etc.). The request may include various appropriate parameters (e.g., consumer type, establishment type, purchase amount, etc.) that may be used to identify appropriate information based on the request.

Next, the process may retrieve (at 1120) the requested user information. Such information may be retrieved by, for instance, accessing a remote storage of some embodiments. Process 1100 may then compile (at 1130) the retrieved information. The information may be compiled in various appropriate ways (e.g., based on the requested elements, based on user preference, based on various protocols, etc.).

Finally, the process may provide (at 1140) the compiled information to the requestor and then may end. The information may be provided in various appropriate ways and/or formats based on various appropriate criteria, parameters, etc.

Process 1100 may be performed in various different ways. For instance, different embodiments may include different operations, omit various operations, and/or perform the operations in a different order than shown. Some embodiments may divide the process into a set of sub-processes or perform the process as a sub-process of a larger macro process.

G. Example Message Flows

Figure 12:
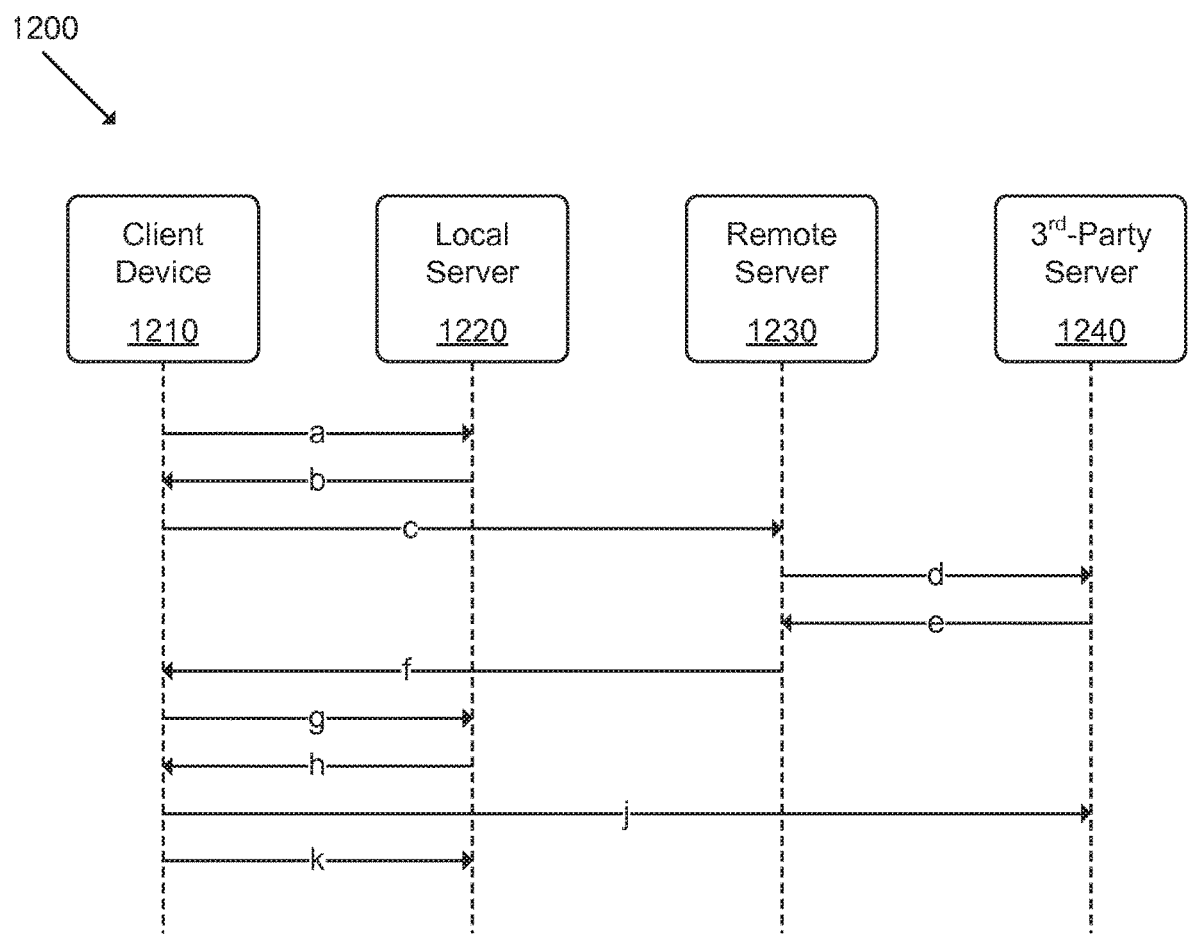
FIG. 12 illustrates a message flow diagram of a conceptual communication protocol used by some embodiments to facilitate payment and/or enrollment.

FIG. 12 illustrates a message flow diagram of a conceptual communication protocol 1200 used by some embodiments to facilitate payment and/or enrollment. As shown, the communication protocol may be implemented among various devices including a client device 1210, a local server 1220, a remote server 1230, and a third-party server 1240. The elements and message flow of FIG. 12 is presented for example purposes only. Many different message flows may occur depending on various relevant factors (e.g., available system elements and/or sub-elements, selections made by users, approval and/or denial of various requests to third parties or external systems, etc.).

In this example, the client device 1210 may be associated with a server at a restaurant, the local server 1220 may be a point-of-sale system used by the restaurant, the remote server 1230 may include a set of remote devices provided by the system of some embodiments, and the third-party server 1240 may include a set of remote devices provided by a third party payment processor.

During operation, a server may initiate checkout for a customer by making a selection using a client device and client-side application of some embodiments. Such a selection may cause a message, 'a', to be sent to the local server 1220 from the client device 1210. The local server 1220 may compile a bill or tab associated with the customer and send a response, 'b', that includes the bill (e.g., a listing of items purchased by the consumer, applicable taxes, etc.).

The client device 1210 may, in turn, send a message, 'c', to the remote server 1230 which may include the bill sent in response 'b' and information regarding a payment method for the user (e.g., credit card information swiped using the client device 1210) along with a request for processing. In addition, message 'c' may include information regarding user enrollment (for a new user) and/or updated payment information (e.g., when an existing user adds a new payment method). Such a message may include transaction information associated with the consumer interaction (e.g., bill amount, establishment location, etc.) that may be used to update reward program information associated with the user.

The remote server 1230 may receive message 'c' and generate and send a request, 'd' for processing to the third-party server 1240. Such a request may include payment information (e.g., credit card number, name, authorization code, etc.), amount to be paid, and/or other appropriate information. The third-party server may analyze the request 'd' and determine whether to process the payment. Such a determination may be made based on various appropriate criteria (e.g., credit limit of the user, reputation of the establishment, etc.).

The third-party server 1240 may send, to the remote server 1230, a response, 'e' that authorizes or rejects the payment request. Such a response may include various authorization codes, identifying information, etc. The remote server may, in turn, send a response, 'f' to the client device 1210 indicating the result of the payment processing and/or any associated information.

If the payment has been rejected, the client device 1210 may prompt the user to enter another form of payment and repeat messages 'c'-'f' until a payment is authorized, at which point the client device 1210 may send a confirmation message, 'g' to the local server 1220 indicating the results of the payment processing. The local server may return a message, 'h' indicating that the payment has been applied and the consumer transaction is complete.

The client device 1210 may then send a message, 'j' to the third-party server 1240 verifying the completed transaction. Finally, the client device 1210 may send a termination message, 'k' to the local server 1220 indicating that the consumer transaction has been completed and all information sent to the remote server 1230.

One of ordinary skill in the art will recognize that the message flow diagram 1200 is presented for example purposes only and that different embodiments may communicate in various different ways. For instance, in some embodiments a client device may not be able to communicate directly with a remote server and may instead have to relay messages through a local server. As another example, in some embodiments, a client device may communicate directly with a third-party server without use of a remote server. In addition, different embodiments may send different sets of messages, among different devices, and/or in different orders than shown.

Figure 15B:
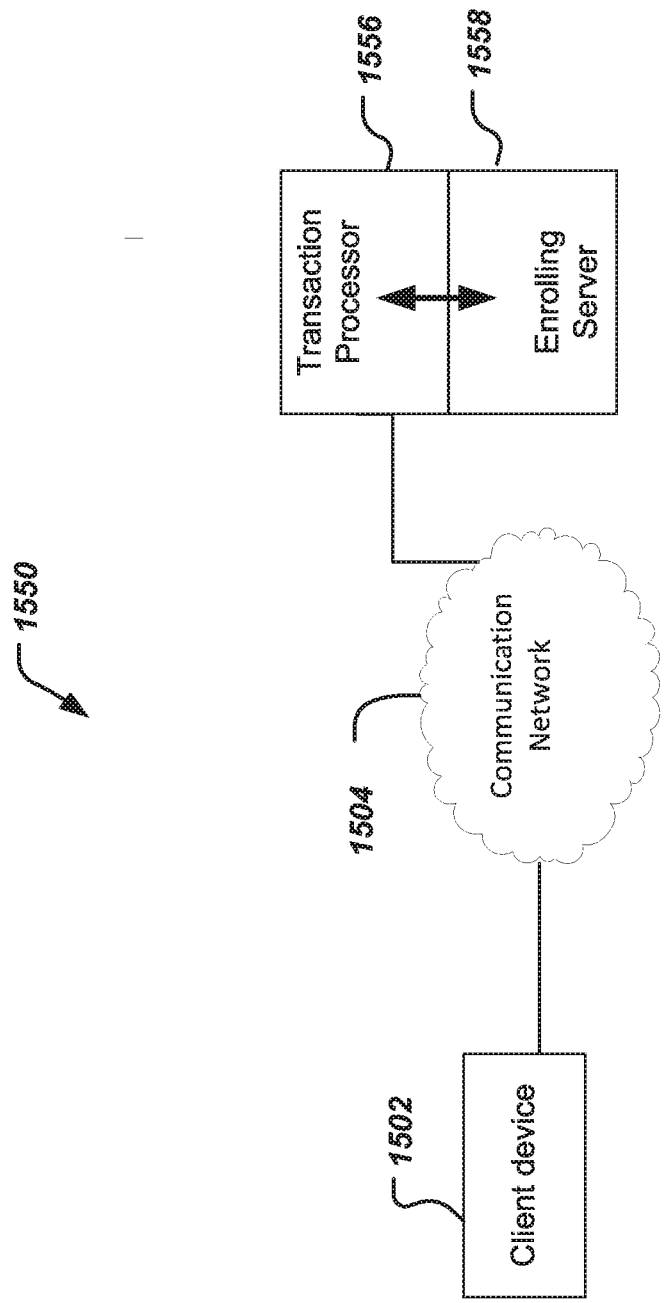
FIG. 15B shows a block diagram of another example of a computer network for data processing.

With reference to FIG. 15A and FIG. 15B, some embodiments of a data communication system in which user-controlled real-time data processing may be implemented, are disclosed. A user, e.g., a consumer or customer who is paying a bill, or making a financial transaction, or is controlling processing of data in some other way, may be able to control data processing steps either via explicit control on a per-transaction basis, or based on implicit control from prior user selections or transactions, occurring on a remotely located server.

FIG. 15A shows an example data communication system 1500 that includes a client device 1502, using which consumers input payment information and a program enrollment option to the data communication system, a transaction processor 1506 communicatively coupled to the client device via a communication network 1504, the transaction processor 1506 receiving the input payment information and the program enrollment option and determining a response to the client device 1502, and an enrolling server 1508 communicatively coupled to the client device 1502 and the transaction processor to modify amount of payment from the input payment information based on a predefined set of rules and status of the consumers, the enrolling server 1508 including a database that stores a unique personal account number associated with each consumer. The client device 1502 may be, e.g., the client device 120. The transaction processor 1506 may be similar to the remote server 140.

FIG. 15B shows an example embodiment in which the data communication system 1550 operates similarly to the data communication system 1500, except the transaction processor 1556 (generally similar to the transaction processor 1506) and the enrolling server 1558 (generally similar to the enrolling server 1508) may be co-located on a single hardware platform and may communicate with each other via internal communication mechanism such as an internal data bus of a computer system or software application programmer interface (APIs). In such embodiments, the enrolling server 1558 may use explicit user selection, e.g., opt-in menu selection, and/or implicit user actions, e.g., accumulated rewards of a user based on the user's previous transactions, to modify data being processed by the transaction processor 1556. For example, when the transaction processor receives a data processing request, in real-time, the transaction processor may pass the information about data (e.g., purchase amount) and identity of the patron or the user whose transaction is being processed, to the enrolling server 1558. In turn, the enrolling server 1558 may modify the transaction, e.g., provide a discount to the user, and return the result in real-time to the transaction processor 1556. Payment processing of credit card transactions is mostly an automated process and currently there are no technical solutions available to alter the flow of the payment process, while still maintaining real-time responsiveness to the consumer who is making the payment.

Using the disclosed techniques, the payment processing flow can be interrupted, and changes can be made to the payment data, while maintaining the real-time nature of the payment. The process of altering the final payment amount can be sped up by using unique identifiers for tracking the consumers. Furthermore, by associating payment data with a consumer's selection of whether or not the consumer wishes to benefit from the alteration, e.g., a discount on the payment, the speed of processing is maintained, such that the consumer does not have to go through multiple menu screens or physical papers. The use of the enrolling server 1558 in conjunction with the transaction processor 1556 can thus identify, in real-time, whether the consumer is a known member of a rewards program or not, and when not a known member, whether the consumer wishes to enroll in the program.

Figure 16:
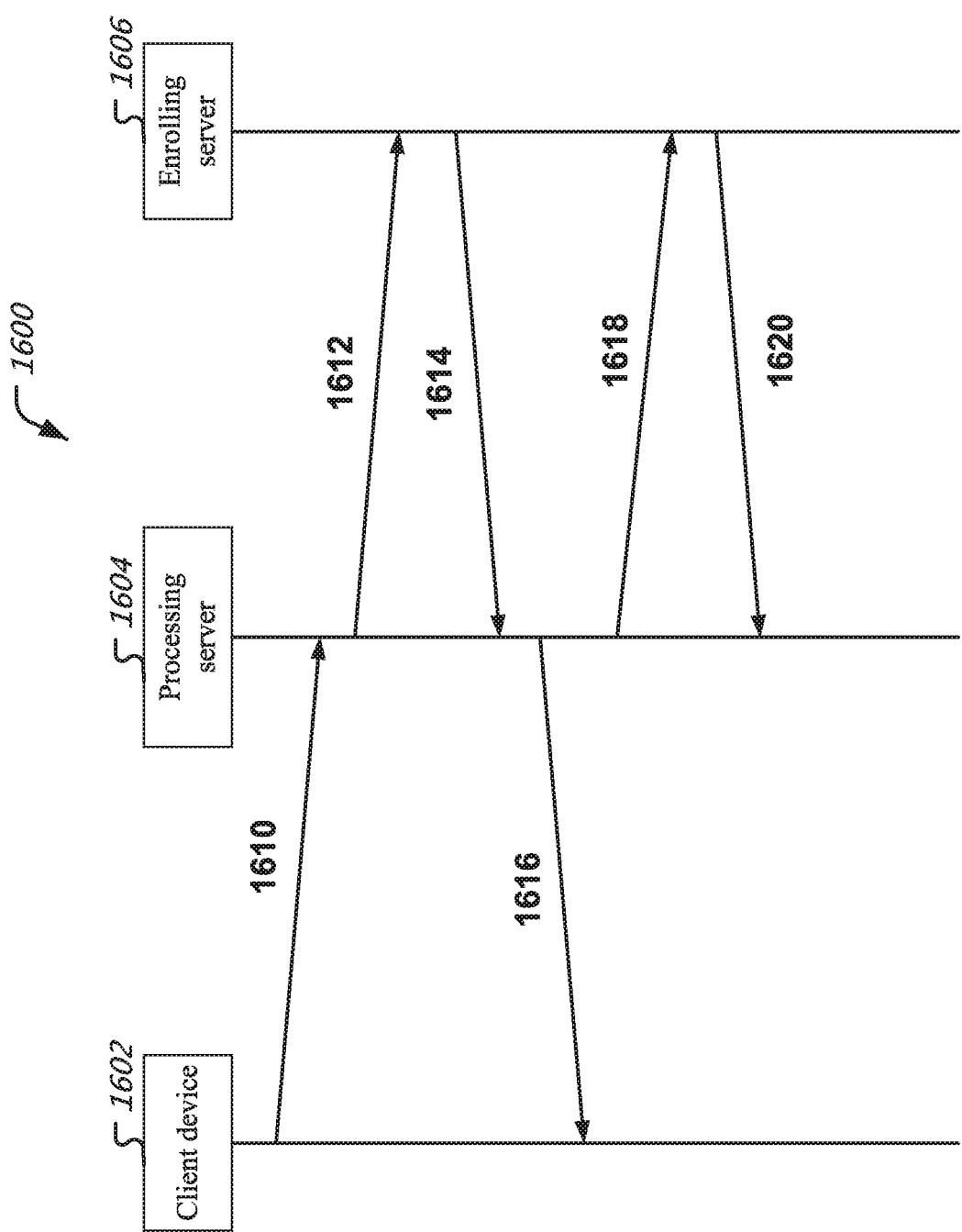
FIG. 16 shows an example of messages exchanged in a data processing system.

FIG. 16 illustrates a message flow diagram of a conceptual communication protocol 1600 used by some embodiments to perform data processing. As shown, the communication protocol may be implemented among various devices including a client device 1602 (which may be similar to 1502 or 1210), a processing server 1604 (e.g., the remote server 1230), and a an enrolling server 1606. The elements and message flow of FIG. 12 is presented for example purposes only. Many different message flows may occur depending on various relevant factors (e.g., available system elements and/or sub-elements, selections made by users, approval and/or denial of various requests to third parties or external systems, etc.).

The client device 1602 may transmit the message 1610 representing a business transaction, e.g., a credit card payment, to the processing server 1604. The message 1610 may include information uniquely identifying a user, e.g., credit card number, amount of money to be applied against the user's balance, user's phone number or email address, etc. The message 1610 may also include a filed indicating that the user wishes to opt into an enrollment plan.

The reception of the message 1610 may cause the processing server 1604 to communication a message 1612, conditional upon whether the user has indicated to opt-in, to the enrolling server 1606. In the message 1612, the processing server 1604 may identify the user to the enrolling server 1606, along with a unique additional information such as user's email address or phone number.

The enrolling server 1606 may process the received user information and generate a message 1614 to the processing server 1604, indicating whether or not the user was enrolled and a reduction to be applied to the user's payment. The processing server 1604 subsequently sends the message 1616 completing the data processing transaction running on the client device 1602. The processing server 1604 may then send transaction completion message 1618 to the enrollment server 1606. The processing server 1604 may receive a confirmation message 1620 from the enrolling server, thereby completing the transaction. In one advantageous aspect, the communication protocol thus allows consumer, or user, control of transaction data being processed on the processing server 1604, wherein, in real-time, adjustments may be made to the transaction data, based on the consumer's selection of a preference to opt into the transaction or stay out, and may also modify the amount of transaction based on previous such transactions performed by the consumer (e.g., loyalty rewards).

In some embodiments, a method of performing real-time data processing includes receiving a first message including data comprising personal information about a consumer, information about a payment that the consumer is about to make, information about the consumer wanting to opt into a loyalty enrollment program, checking whether the personal information received in the message is already associated with an existing user account, when the received card payment is associated with the existing user account of the consumer, updating information regarding the existing user account, when the received card payment is not associated with the existing user account, then associating the existing user account to associate the received card payment with the existing user account, altering the information about the payment that the consumer is about to make based on the association, and sending a second message that includes the altered information about the payment and additional information for display to the consumer. In some embodiments, the altering includes, in real-time, retrieving a set of rules associated with a rewards for the user account, evaluating the information regarding the existing user account based at least partly on the set of rules, and determining a redemption to be applied to the payment that the consumer is about to make based at least partly on the evaluation, wherein the at least one reward comprises at least one of an instant reward and an accrued reward reducing amount of the payment that the consumer is about to make based on a loyalty rule.

IV. Examples of Graphical User Interface (GUI) Elements

Figure 13:
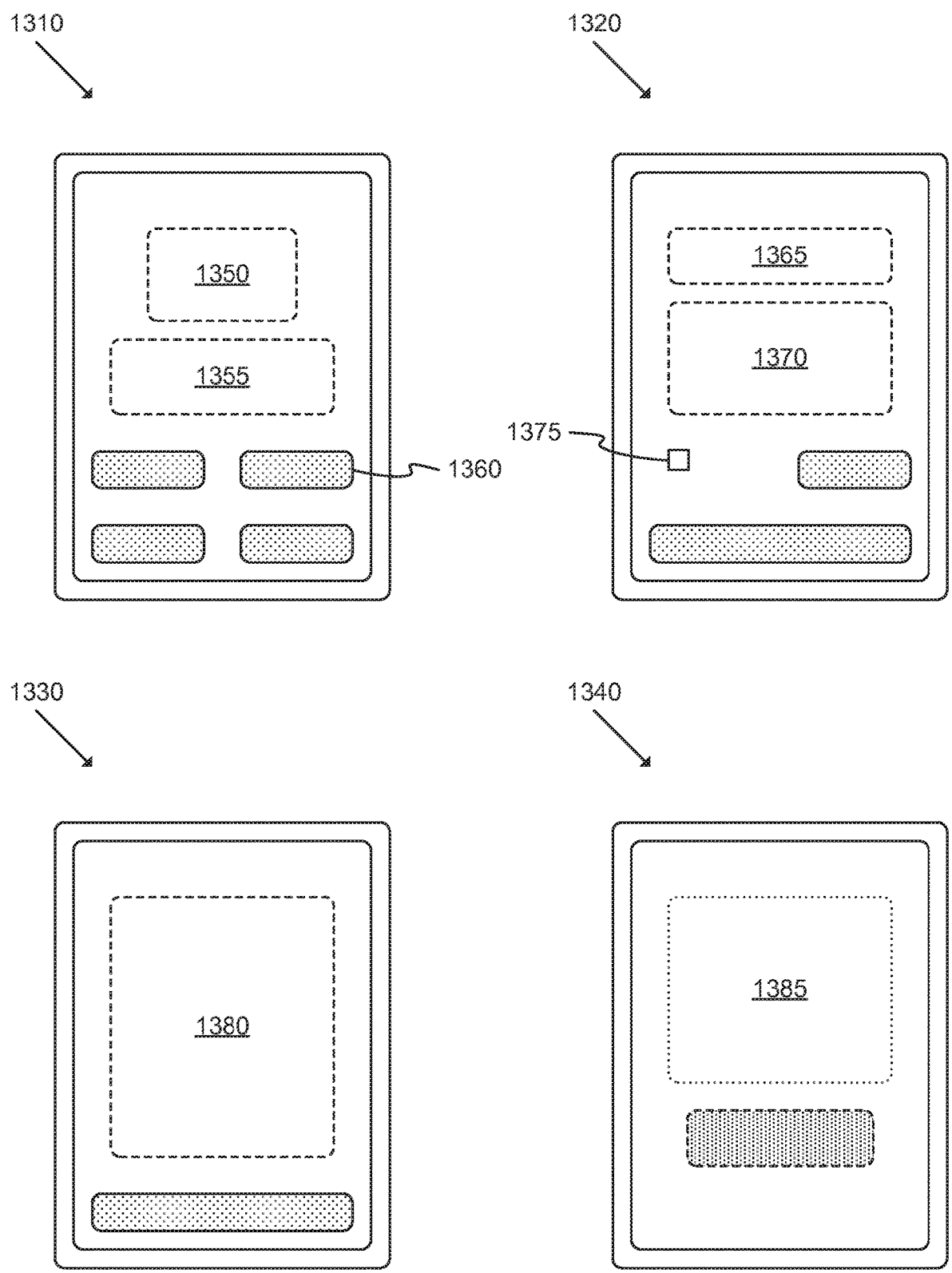
FIG. 13 illustrates various graphical user interfaces (GUIs) and associated sub-elements provided by some embodiments to allow a user to participate in one or more programs offered by some embodiments.

FIG. 13 illustrates various GUIs 1310-1340 and associated sub-elements provided by some embodiments to allow a user to participate in one or more programs offered by some embodiments. Such GUIs may be presented using an appropriate client device (e.g., client device 120 described above).

As shown, GUI 1310 may include a first graphic element 1350, a second graphic element 1355, and a set of selection elements 1360. In this example, the first graphic element 1350 may include an enrollment offer (e.g., enroll now to receive instant reward) while the second graphic element 1355 may include a listing of enrollment benefit and/or other information (e.g., "5% off future purchases", "participation is free", etc.). The set of selection elements 1160 may include buttons or other selectable elements and may be labeled with various appropriate selection options (e.g., "yes, enroll", "no thanks", "already a member", "add new payment method", etc.).

GUI 1320 may include multiple graphic elements 1365-1370, one or more input elements 1375, and various selection elements 1360. Graphic element 1365 may include a set of instructions for enrollment while graphic element 1370 may include a combination of displayed text and text entry fields (e.g., name, card number, email, etc.). Each input element 1375 may allow a user to acknowledge terms and conditions, privacy policy, etc. (e.g., by checking a box). The selection elements 1360 may include various options (e.g., enroll, checkout, etc.).

GUI 1330 may include a graphic element 1380 that may include a summary of the user's bill with rewards applied (if applicable) and a selection element 1360 (e.g., go to signature). GUI 1340 may include an input element 1385 (e.g., a region where a user may enter a signature on a touchscreen device) and a selection element 1360 (e.g., accept signature).

One of ordinary skill in the art will recognize that different embodiments may include various different GUI elements than those shown in the example of FIG. 13. For instance, some embodiments may include various GUIs intended for use by a server or cashier and may include appropriate elements for such use (e.g., table selection elements, menu selection elements, etc.). As another example, although the various GUIs were shown as using a "portrait" orientation, different embodiments (and/or different GUIs) may utilize a "landscape" orientation (and/or be able to automatically shift among orientations).

V. Example of Computer Systems

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors ("DSP"), Application-Specific ICs ("ASIC"), Field Programmable Gate Arrays ("FPGA"), etc.) the instructions cause the computational element(s) to perform actions specified in the instructions.

Figure 14:
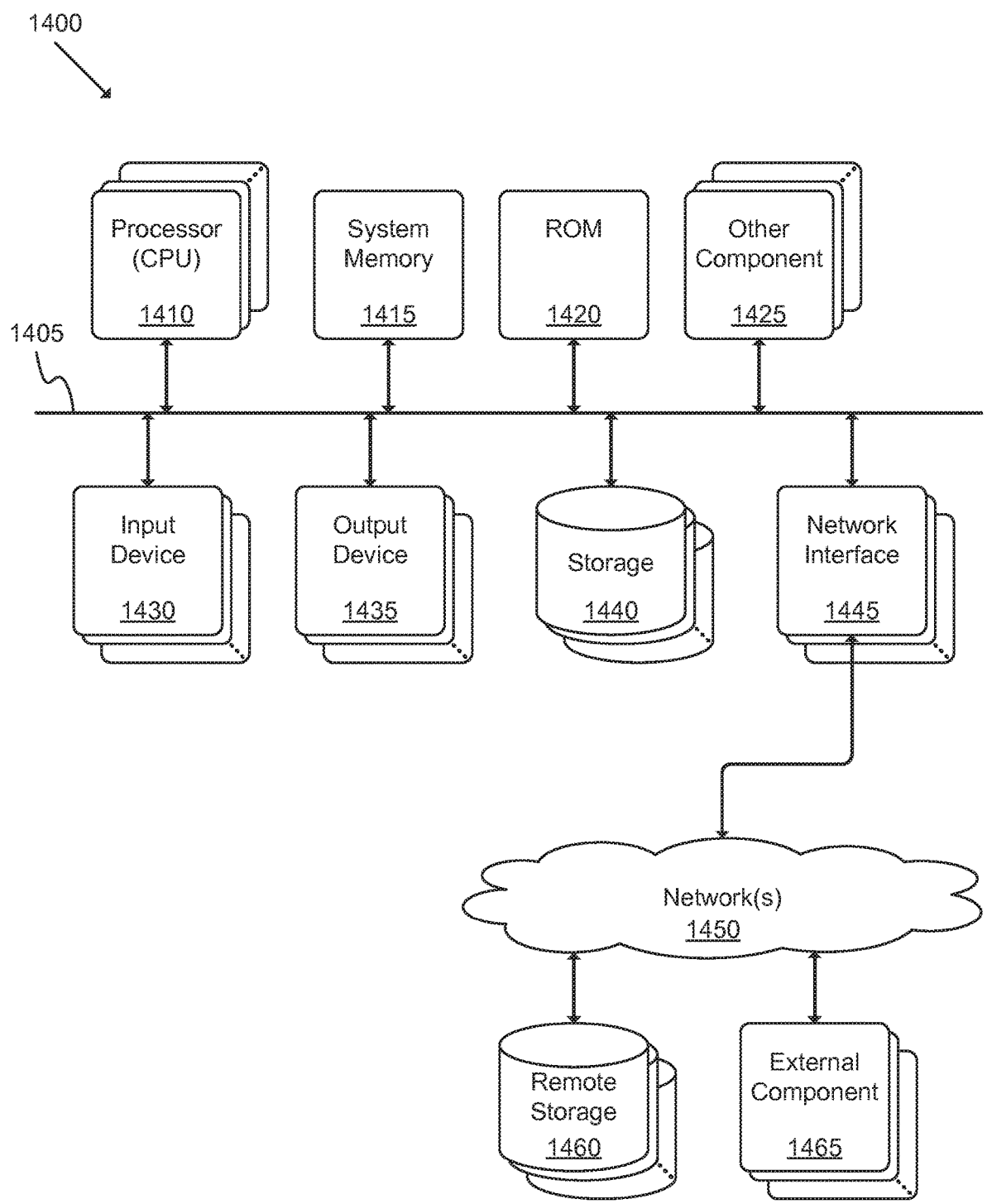
FIG. 14 conceptually illustrates a schematic block diagram of a computer system with which some embodiments may be implemented.

FIG. 14 conceptually illustrates a schematic block diagram of a computer system 1400 with which some embodiments may be implemented. For example, the system described above in reference to FIG. 1 may be at least partially implemented using computer system 1400. As another example, the processes described in reference to FIGS. 6-10 may be at least partially implemented using sets of instructions that are executed using computer system 1400.

Computer system 1400 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 1400 may include a bus 1405, at least one processing element 1410, a system memory 1415, a read-only memory ("ROM") 1420, other components (e.g., a graphics processing unit) 1425, input devices 1430, output devices 1435, permanent storage devices 1440, and/or network interfaces 1445. The components of computer system 1400 may be electronic devices that automatically perform operations based on digital and/or analog input signals. For instance, the various examples of GUI elements described above in reference to FIG. 13 may be at least partially implemented using sets of instructions that are run on computer system 1400 and displayed using the output devices 1435.

Bus 1405 represents all communication pathways among the elements of computer system 1400. Such pathways may include wired, wireless, optical, and/or other appropriate communication pathways. For example, input devices 1430 and/or output devices 1435 may be coupled to the system 1400 using a wireless connection protocol or system. The processor 1410 may, in order to execute the processes of some embodiments, retrieve instructions to execute and data to process from components such as system memory 1415, ROM 1420, and permanent storage device 1440. Such instructions and data may be passed over bus 1405.

ROM 1420 may store static data and instructions that may be used by processor 1410 and/or other elements of the computer system. Permanent storage device 1440 may be a read-and-write memory device. This device may be a non-volatile memory unit that stores instructions and data even when computer system 1400 is off or unpowered. Permanent storage device 1440 may include a mass-storage device (such as a magnetic or optical disk and its corresponding disk drive).

Computer system 1400 may use a removable storage device and/or a remote storage device as the permanent storage device. System memory 1415 may be a volatile read-and-write memory, such as a random access memory ("RAM"). The system memory may store some of the instructions and data that the processor uses at runtime. The sets of instructions and/or data used to implement some embodiments may be stored in the system memory 1415, the permanent storage device 1440, and/or the read-only memory 1420. Other components 1425 may perform various other functions.

Input devices 1430 may enable a user to communicate information to the computer system and/or manipulate various operations of the system. The input devices may include keyboards, cursor control devices, audio input devices and/or video input devices. Output devices 1435 may include printers, displays, and/or audio devices. Some or all of the input and/or output devices may be wirelessly or optically connected to the computer system.

Finally, as shown in FIG. 14, computer system 1400 may be coupled to a network 1450 through a network interface 1445. For example, computer system 1400 may be coupled to a web server on the Internet such that a web browser executing on computer system 1400 may interact with the web server as a user interacts with an interface that operates in the web browser. In some embodiments, the network interface 1445 may include one or more APIs. The network interface and associated network(s) 1450 may allow the system 1400 to access various remote storages 1460 and/or other external components 1465 (e.g., third-party servers).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1400 may be used in conjunction with the embodiments disclosed herein. Moreover, one of ordinary skill in the art will appreciate that many other system configurations may also be used in conjunction with the invention or components of the disclosed technology.

It should be recognized by one of ordinary skill in the art that the user may be identified using a unique identifier derived from unique user information such as a primary account number (PAN). If this PAN is cancelled (lost or stolen) and a new PAN is created by the issuer, the previous unique ID may be automatically associated with the new PAN. This also allows the update of unique ID's directly with the card Issuers themselves.

The techniques described in the present document can also be used to collect rating information from a user, e.g., filling a satisfaction survey by the user to review the service or product received. For example, if the user rating is below a pre-set threshold, then an SMS may be sent to a manager to alert the manager of user's dissatisfaction.

If an existing member pays cash at a participating merchant, they would normally not receive credit for that transaction. However, using the presently disclosed technology, a web link may be provided to a customer on the user interface when completing transaction, using which, customers can upload receipt information that will allow them to receive rewards for the cash transaction.

When a customer wishes to pay with their mobile phone using near field communication (NFC) technology, in addition to sending the payment credentials, the customer can send their unique ID credentials which includes all the same information that the enrolling server uses to uniquely identify a user. Advantageously, the user can actually bypass the inputting of information on the POS and actually just send it with their payment, including their opt in and also receiving an instant discount.

Some businesses currently use beacon transmissions to track movement of a mobile phone that has Bluetooth enabled. The challenge is the beacon tracking mechanism is not connected to the actual transaction that takes places, therefore not being able to close the gap between tracking the customer's movements and the customer's transactions. By using mobile phone specific information for completion of transactions, the described technology can track a user and pair with other users when they have come in and compare the movements to transactions and ultimately determine which phone belongs to which unique id.

In some embodiments, when an existing member known to the enrolling server 1606 enters a new store and their card is swiped for payment, the unique ID is triggered in the enrolling server. Using this correlation, user's email field with the existing email on file linked to the unique ID, which is linked to the PAN the customer is using.

In some embodiments, a customer can sign up for the rewards program at a merchant and instead of taking the redemption earned by their spending with that particular merchant, they can donate the redemption to a non-profit organization.

Some embodiments may be in the form of a non-transitory computer-readable storage medium storing a software application including instructions that, when executed by one or more computers, cause the one or more computers to process a payment and to update rewards program information by a merchant by generating a bill for a set of goods or services provided to a consumer, receiving a method of payment from the consumer, displaying a user interface on the payment processing device, the user interface configured to receive additional personal information uniquely identifying the customer on the payment processing device, the additional personal information comprising at least one form element, sending the personal information to a first server, and receiving the at least one reward from the server. The first server is configured to use an application programming interface to identify at least one reward based on the at least one form element, the application programming interface configured to communicate with one or more servers, determine whether an existing user account of an rewards program of the merchant is associated with the method of payment. The server is configured to update the rewards program information associated with the existing user account based at least partly on the bill for a particular existing user account with which the received method of payment is determined to be associated and create a new user account associated with the rewards program for the consumer based at least on the method of payment for a consumer who has no existing user account of the rewards program. In some embodiments, the method of payment is a credit card or ultimately linked to a credit card. In some embodiments, the rewards program is associated with one of a restaurant, a grocery store, an automotive service establishment, a mobile commerce utility, an ecommerce site, and a retailer. In some embodiments, the software application further comprises sets of instructions for generating a rewards program offer based at least partly on the updated rewards program information for the particular existing user account with which the received method of payment is determined to be associated. In some embodiments, the software application further comprises sets of instructions for creating the new user account. In some embodiments, the software application further comprises sets of instructions for generating an instant reward and offering the reward to the consumer. In some embodiments, the software application comprises a client-side application executed by a client device configured to be communicatively coupled with a server-side application. A method according to some embodiments can be described using the following clauses.

Clause 1. A method for facilitating a consumer to enroll into a rewards program while making a payment for a purchase using a payment processing device having a user interface, the method comprising: presenting a bill associated with a consumer purchase to the consumer using the payment processing device, receiving a selected payment option from the consumer in response to the bill, prompting the consumer to select from one of following options on the user interface: (1) enrolling into the rewards program as a new rewards program user; (2) having an existing user account of the rewards program, or (3) opting out the rewards program, and in response to the consumer selection of option (1): receiving payment information of the selected payment option by the consumer to make a payment, creating an user account of the rewards program based at least on the payment information, displaying a user interface on the payment processing device, the user interface configured to receive additional personal information uniquely identifying the customer on the payment processing device, the additional personal information comprising at least one form element, sending the additional personal information to a first server that is configured to use an application programming interface to identify at least one promotional reward based on the at least one form element, the application programming interface configured to communicate with one or more servers, and finalizing the payment to include an reward from the rewards program.

Clause 2. The method of clause 1, wherein the method further comprises: in response to the consumer selection of option (2), receiving payment information of the selected payment option by the consumer to make a payment, determining whether the received payment information is associated with the existing user account, and for a particular existing user account with which the received payment information is determined to be associated, updating information regarding the existing user account associated with the rewards program based at least on the bill; otherwise, updating the existing user account by associating the received payment information with the existing user account, and finalizing the payment to include an reward from the rewards program.

Clause 3. The method of clause 1, wherein the method further comprises: in response to the consumer selection of option (3) receiving payment information of the selected payment option by the consumer to make a payment, and finalizing the payment.

Clause 4. The method of clause 1, wherein the selected payment option is a credit payment.

Clause 5. The method of clause 1, wherein the received payment information comprises credit card information.

Clause 6. The method of clause 1, wherein creating the user account of the rewards program includes receiving an input of an email address from the consumer.

Clause 7. The method of clause 1, wherein creating the user account of the rewards program further includes receiving one or more of the following: a mobile telephone number, a birthday, and a ZIP code.

Another method according to some embodiments can be described using the following clauses Clause 8. A method for facilitating a consumer to enroll into a rewards program while making a payment for a purchase using a payment processing device having an user interface, the method comprising: presenting a bill associated with a consumer purchase to the consumer using the payment processing device, receiving payment information from the consumer to make a payment, prompting the consumer, on the user interface, to enroll into an rewards program to receive an instant discount, receiving an acknowledgement from the consumer to enroll into the rewards program, creating an user account of the rewards program based at least on the payment information, displaying a user interface on the payment processing device, the user interface configured to receive additional personal information uniquely identifying the customer on the payment processing device, the additional personal information comprising at least one form element, sending the additional personal information to a first server that is configured to use an application programming interface to identify at least one promotional reward based on the at least one form element, the application programming interface configured to communicate with one or more servers, and finalizing the payment to include the instant discount.

Clause 9. The method of Clause 8, wherein prompting the consumer to enroll includes prompting the consumer to enter an email address, and wherein receiving the acknowledgement from the consumer including receiving an email address from the consumer.

Clause 10. The method of Clause 9, wherein creating the user account of the rewards program further includes linking the email address to the user account.

Clause 11. The method of Clause 8, wherein receiving the payment information includes receiving credit card information using a credit card swiping element.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

While the technology has been described with reference to numerous specific details, one of ordinary skill in the art will recognize that the technology may be embodied in other specific forms. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. An automated method to enroll and instantly reward a consumer in a rewards program affiliated with a merchant in real-time and at a point of sale, the method comprising:
   providing a bill to the consumer using a payment processing device of a merchant at the point-of-sale;
   receiving a card payment from the consumer to pay the bill and initiating card processing as a result of a credit card being presented at the payment processing device;
   checking whether the consumer is an existing user of the rewards program affiliated with the merchant;
   determining that the consumer is not an existing user of the rewards program affiliated with the merchant;
   receiving an additional personal information uniquely identifying the consumer through the payment processing device;
   displaying a message on the payment processing device providing an incentive to enroll in the rewards program affiliated with the merchant, the incentive including an offer of a discount on a final payment amount of the bill;
   enrolling the consumer with the rewards program affiliated with the merchant based on receiving an input from the consumer on the merchant's payment processing device at the point-of-sale indicating that the consumer wishes to participate in the rewards program, wherein the input is received from selection of a selectable element displayed on the payment processing device that affirms enrollment by the consumer, and wherein the enrolling includes generating a new user rewards program account for the consumer;
   altering the final payment amount of the bill to be paid by applying an instant reward to the bill based on the consumer enrolling in the rewards program; and
   completing the card processing of the card payment by charging the final payment amount to the credit card to complete payment of the bill;
   subsequent to the enrolling the consumer with the rewards program and in a separate transaction between the consumer and the merchant using the payment processing device of the merchant at the point-of-sale, determining that a second card payment is not associated with a user account of the rewards program affiliated with the merchant;

checking whether the consumer is already associated with an existing user account for the rewards program affiliated with the merchant using personal information about the consumer;

determining whether the personal information is associated with the new user rewards program account for the consumer; and retrieving, due to the determining that the consumer is associated with the rewards program, user account information associated with the new user rewards program account.

2. The automated method of claim 1, wherein the card payment includes a payment directly from the credit card or a payment that is not directly from the credit card but is ultimately linked to the credit card.

3. The automated method of claim 1, further comprising associating the card payment with a system-generated unique identifier associated with the generated new user rewards program account of the consumer.

4. The automated method of claim 1, further comprising updating the user account information based at least partly on the bill.

5. The automated method of claim 1, further comprising updating the user account information based at least partly on the card payment.

6. The automated method of claim 1, further comprising:
retrieving a set of rules associated with the rewards program from one or more computers;
evaluating information regarding an existing user account of the consumer based at least partly on the set of rules;
determining a reward to be applied to the bill based at least partly on the evaluating, wherein the reward comprises at least one of an instant reward or an accrued reward; and
processing to finalize the card payment.

7. The automated method of claim 1, wherein the additional personal information includes at least one of: the consumer's social media profile, an email address, a mobile phone number, or ZIP code.

8. The automated method of claim 1, further comprising sending the consumer a receipt and/or a marketing offer generated based on the consumer's spend behavior.

9. The automated method of claim 8, wherein sending the consumer the receipt includes emailing the receipt.

10. The automated method of claim 1, wherein the point-of-sale of the merchant includes a mobile device-based point-of-sale.

11. The automated method of claim 1, wherein the input from the consumer is to enroll into a rewards program to receive an instant reward.

12. The automated method of claim 1, wherein the providing the bill includes providing the bill on a screen externally connected to the payment processing device.

13. The automated method of claim 2, wherein the payment that is not directly from the credit card comprises a payment made from a mobile phone using near field communication (NFC) technology.

14. The automated method of claim 1, further comprising:
subsequent to the enrolling the consumer with the rewards program, receiving a subsequent card payment from the consumer for payment of a subsequent bill for the merchant;
initiating a subsequent card processing as a result of the credit card of the consumer being presented at the payment processing device of the merchant;
determining that the consumer is associated with the rewards program affiliated with the merchant; and
completing processing of the subsequent card payment by reducing the subsequent bill by automatically applying a portion of a redemption balance associated with the customer in the rewards program.

* * * * *